United States Patent
Yamane et al.

(10) Patent No.: US 9,600,972 B2
(45) Date of Patent: Mar. 21, 2017

(54) GAME SYSTEM, GAME SERVER THEREFOR, CONTROL METHOD FOR GAME SERVER, AND COMPUTER READABLE RECORDING MEDIUM

(71) Applicant: KONAMI DIGITAL ENTERTAINMENT CO., LTD., Minato-ku, Tokyo (JP)

(72) Inventors: Kiyohiko Yamane, Tokyo (JP); Ryu Nagashima, Tokyo (JP); Toshio Yoshioka, Tokyo (JP); Masayuki Saruta, Tokyo (JP); Teruhiko Kimura, Tokyo (JP); Saori Hanaoka, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 84 days.

(21) Appl. No.: 14/260,955

(22) Filed: Apr. 24, 2014

(65) Prior Publication Data

US 2014/0235356 A1    Aug. 21, 2014

Related U.S. Application Data

(63) Continuation-in-part of application No. PCT/JP2012/074690, filed on Sep. 26, 2012.

(30) Foreign Application Priority Data

Oct. 26, 2011  (JP) .................................. 2011-234892
Feb. 6, 2012  (JP) .................................. 2012-022867

(51) Int. Cl.
*A63F 13/493*    (2014.01)
*G07F 17/32*    (2006.01)
(Continued)

(52) U.S. Cl.
CPC .......... *G07F 17/3281* (2013.01); *A63F 13/12* (2013.01); *A63F 13/2145* (2014.09);
(Continued)

(58) Field of Classification Search
CPC .......... A63F 13/30; A63F 13/31; A63F 13/49; A63F 13/70; A63F 13/77; A63F 13/79;
(Continued)

(56) References Cited

U.S. PATENT DOCUMENTS

2002/0034981 A1    3/2002  Hisada
2006/0030408 A1*   2/2006  Kiiskinen ............... A63F 13/12
                                                              463/42
(Continued)

FOREIGN PATENT DOCUMENTS

JP    2001-340646 A    12/2001
JP    2002-85852 A     3/2002
(Continued)

OTHER PUBLICATIONS

Social Game General Information Magazine Appli-Style vol. 2, published by East Press, Apr. 1, 2011, pp. 26-29.
(Continued)

*Primary Examiner* — Allen Chan
(74) *Attorney, Agent, or Firm* — Sughrue Mion, PLLC

(57) ABSTRACT

A first game system includes plural terminal devices at which a game can be played by a player; and a game server configured to communicate with the terminal devices. The first game server stores game data corresponding to the game in a database, and updates game data stored in the database in accordance with the progress of a game that is played at one of the terminal devices, followed by again updating the game data in accordance with the progress of the game that is played at another of the terminal devices.

10 Claims, 30 Drawing Sheets

(51) Int. Cl.
*A63F 13/30* (2014.01)
*A63F 13/2145* (2014.01)
*A63F 13/335* (2014.01)
*A63F 13/798* (2014.01)
*A63F 13/88* (2014.01)

(52) U.S. Cl.
CPC .......... *A63F 13/335* (2014.09); *A63F 13/798* (2014.09); *A63F 13/88* (2014.09); *G07F 17/32* (2013.01); *G07F 17/3267* (2013.01); *G07F 17/3276* (2013.01); *G07F 17/3297* (2013.01)

(58) Field of Classification Search
CPC .............. A63F 2300/40; A63F 2300/55; A63F 2300/5533; A63F 2300/554; G07F 17/32; G07F 17/3281
USPC .......................................................... 463/42
See application file for complete search history.

(56) References Cited

U.S. PATENT DOCUMENTS

| | | | |
|---|---|---|---|
| 2006/0121971 A1 | 6/2006 | Slomiany et al. | |
| 2007/0066400 A1* | 3/2007 | Kogo | G07F 17/32 463/42 |
| 2009/0098942 A1 | 4/2009 | Fukuda et al. | |
| 2009/0170607 A1 | 7/2009 | Chiao et al. | |
| 2009/0247260 A1 | 10/2009 | Goto et al. | |
| 2009/0270180 A1* | 10/2009 | Stewart | G07F 17/32 463/42 |
| 2010/0120528 A1* | 5/2010 | Mori | A63F 13/12 463/42 |
| 2013/0337901 A1 | 12/2013 | Saruta | |

FOREIGN PATENT DOCUMENTS

| | | |
|---|---|---|
| JP | 2002-119765 A | 4/2002 |
| JP | 2007-61253 A | 3/2007 |
| JP | 2007-61472 A | 3/2007 |
| JP | 2007-117656 A | 5/2007 |
| JP | 2007-175216 A | 7/2007 |
| JP | 2009-160369 A | 7/2009 |
| JP | 2011-164918 A | 8/2011 |
| JP | 5033256 B1 | 9/2012 |

OTHER PUBLICATIONS

Japanese Office Action for Japanese Patent Application No. 2012-179725, dated Oct. 16, 2012, (continuation of JP 2011-234892, on the basis of which the priory is claimed).

Japanese Office Action for Japanese Patent Application No. 2012-189594, dated Nov. 6, 2012, (divisional of JP 2012-179725, on the basis of which the priory is claimed).

International Search Report for PCT/JP2012/072069, dated Nov. 13, 2012.

International Search Report for PCT/JP2012/074690, dated Nov. 13, 2012.

Final Office Action issued in U.S. Appl. No. 14/262,206 dated Jan. 17, 2017.

* cited by examiner

FIG. 17

TABLE: NUMBER OF MEDALS ACQUIRED BY PLAYER

| NICKNAME | NUMBER OF MEDALS ACQUIRED |
|---|---|
| ⋮ | ⋮ |
| HANZO HATTORI | 4,568 |
| ⋮ | ⋮ |
| MUG | 5,364 ▶ 5,815 |
| ⋮ | ⋮ |
| LITTLE SISTER OF ALICE | 16,285 |
| ⋮ | ⋮ |
| STEPHANIE | 6,003 |
| ⋮ | ⋮ |
| BRIKO | 4,891 |
| ⋮ | ⋮ |

AGGREGATION TIME  2011/10/19 03:00:00

FIG. 18

FIRST GAME RANKING

| RANK | NICKNAME | NUMBER OF MEDALS ACQUIRED |
|---|---|---|
| 1 | LITTLE SISTER OF ALICE | 19,059 |
| 2 | SMART | 12,232 |
| 3 | STEPHANIE | 8,561 |
| 4 | MUG | 6,727 |
| 5 | HANZO HATTORI | 5,962 |
| 6 | BRIKO | 5,551 |
| 7 | SAKI | 5,216 |
| 8 | MACAP | 4,936 |
| 9 | SAKI MIYANAGA | 4,505 |
| 10 | RYU NAKINO | 4,398 |
| 11 | KAIJI AKAGI | 4,264 |
| 12 | NOBUHIKO | 4,234 |
| ⋮ | ⋮ | ⋮ |

AGGREGATION TIME   2011/10/19 05:00:00

FIG. 21

FIRST GAME RANKING

| RANK | NICKNAME | ALLOCATION | POCKET NUMBER |
|---|---|---|---|
| 1 | LITTLE SISTER OF ALICE | | 1 |
| 2 | SMART | | 2 |
| 3 | STEPHANIE | | 3 |
| 4 | MUG | | 4 |
| 5 | HANZO HATTORI | | 5 |
| 6 | BRIKO | | 6 |
| 7 | SAKI | | 7 |
| 8 | MACAP | | 8 |
| 9 | SAKI MIYANAGA | | 9 |
| 10 | RYU NAKINO | | 10 |
| 11 | KAIJI AKAGI | | |
| 12 | NOBUHIKO | | |
| ⋮ | ⋮ | | |

FIG. 23

PLAYER TABLE (A)

| NICKNAME | POCKET NUMBER BET | NUMBER OF MEDALS BET |
|---|---|---|
| MUG | 6 | 213 |

(B)

| NICKNAME | POCKET NUMBER BET | NUMBER OF MEDALS BET |
|---|---|---|
| KIRIKO | 3 | 65 |
| | 5 | 32 |
| | 9 | 12 |

(C)

| NICKNAME | POCKET NUMBER BET | NUMBER OF MEDALS BET |
|---|---|---|
| NOBUHIKO | 1 | 34 |
| | 5 | 21 |

......

AGGREGATION TIME 2011/10/19 07:20:00

FIG. 24

GAME TABLE

| POCKET NUMBER | NICKNAME | TOTAL NUMBER OF MEDALS BET BY POCKET NUMBER a | DRAWING PROBABILITY c | ODDS d |
|---|---|---|---|---|
| 1 | HANZO HATTORI | 8,157 | 0.0357 | 28.0 |
| 2 | MACAP | 8,036 | 0.0352 | 28.4 |
| 3 | BRIKO | 24,563 | 0.1075 | 9.3 |
| 4 | LITTLE SISTER OF ALICE | 49,169 | 0.2151 | 4.6 |
| 5 | SAKI | 32,287 | 0.1413 | 7.1 |
| 6 | MUG | 15,870 | 0.0695 | 14.3 |
| 7 | RYU NAKINO | 16,426 | 0.0719 | 13.9 |
| 8 | SAKI MIYANAGA | 16,051 | 0.0702 | 14.2 |
| 9 | SMART | 7,652 | 0.0335 | 29.8 |
| 10 | STEPHANIE | 42,132 | 0.1844 | 5.4 |

GRAND SUM 220,343 ← b

| 0 | LOSING NUMBER | — | 0.0357 | — |

※ 1/28=0.0357    AGGREGATION TIME 2011/10/19 07:20:00

FIG. 27

| POCKET NUMBER | NICKNAME | | | |
|---|---|---|---|---|
| | | ODDS | SUM OF MEDALS | THE NUMBER OF ANTICIPATORS |

SWITCH — TAP POCKET NUMBER TO BET.

| Pocket | Nickname | Odds | Sum of Medals | Anticipators |
|---|---|---|---|---|
| 1 | HANZO HATTORI | ×28.0 | 8,157 | 420 |
| 2 | MACAP | ×28.4 | 8,036 | 420 |
| 3 | BRIKO | ×9.3 | 24,563 | 645 |
| 4 | LITTLE SISTER OF ALICE | ×4.6 | 32,287 | 802 |
| 5 | SAKI | | | |

52

GAME SYSTEM, GAME SERVER THEREFOR, CONTROL METHOD FOR GAME SERVER, AND COMPUTER READABLE RECORDING MEDIUM

CROSS REFERENCE TO RELATED APPLICATIONS

This application is a Continuation-in-Part application of PCT Application No. PCT/JP2012/074690, filed Sep. 26, 2012 and based upon and claiming the benefit of priority from prior Japanese Patent Application No. 2011-234892, filed Oct. 26, 2011 and Japanese Patent Application No. 2012-022867, filed Feb. 6, 2012, the entire contents of all of which are incorporated herein by reference.

FIELD OF THE INVENTION

The present invention relates to a game system providing a game at a site such as an SNS (Social Networking Service), to a game server thereof, to a control method for the game server, and relates to a computer readable recording medium having stored therein a program for executing the method.

BACKGROUND ART

In recent years, technology has been widespread for providing various types of games to a terminal device by using the Internet. Such a game includes a native type game provided through execution of a dedicated application program at a terminal device and communicating with an application server. Another type of a game is a web-based game provided by a web server generating a web page in response to an input operation performed at a terminal device and causing the terminal device to display the web page (Non-Patent Document 1).

CITATION LIST

Non-Patent Document

Non-Patent Document 1 "Social Game General Information Magazine Appli-Style Vol. 2", published by East Press, Apr. 1, 2011, pp. 26-29.

PROBLEMS TO BE SOLVED BY THE INVENTION

The present invention was made in consideration of the above, and it is an object of the present invention to provide a new function that interests users and is enjoyable for users.

SUMMARY OF THE INVENTION

A game system according to the present invention is a game system including: plural terminal devices (at least one game device) at which a game can be played by a player; and a game server configured to communicate with the terminal devices, the game server stores game data corresponding to the game in a storage device, and the game server updates game data stored in the storage device in accordance with the progress of a game that is played at one of the terminal devices, followed by again updating (reupdating) the game data in accordance with the progress of the game that is played at another of the terminal devices.

The game data herein is data showing a game state that changes according to the progress of a game. For example, in the case of a pusher game, the game data is data showing the coordinates, tilt (rotation), types, etc., of medals moving on the pusher table, and in the case of a slot machine game, the game data is data showing the stop position of drums, etc., and in the case of a pachinko game, the game data is data showing whether an accessary (tulip, etc.) is open or closed, etc.

An entity that controls the progress of the game in the invention understood herein may be a terminal device in which an exclusive application program has been installed, or alternatively, may be a game server that generates a web screen in accordance with an instruction from a terminal device, to transmit the screen for display at the terminal device.

In another aspect, the present invention is a game server for managing a game played at plural terminal devices with which the game server is communicable, the game server including: a game data manager that stores game data corresponding to a game in a storage device; an updater that updates game data stored in the storage device in accordance with the progress of a game that is played in one of the terminal devices, followed by again updating the game data in accordance with the progress of the game that is played at another of the terminal devices.

The present invention can also be envisaged not only as a game system or a game server, but also a control method for a game server, and a non-transitory computer readable recording medium having stored thereon a program for executing a method in a game server.

BRIEF DESCRIPTION OF THE DRAWINGS

FIG. 17 is a diagram showing the content of a table generated at the first game server.

FIG. 18 is a diagram showing an example of the ranking.

FIG. 21 is a diagram showing allocation in the second game.

FIG. 23 is a diagram showing an example of a player table.

FIG. 24 is a diagram showing an example of a game table.

FIG. 27 is a diagram showing an example of a display screen generated at the second game server.

DESCRIPTION OF EMBODIMENTS

Figure 1:
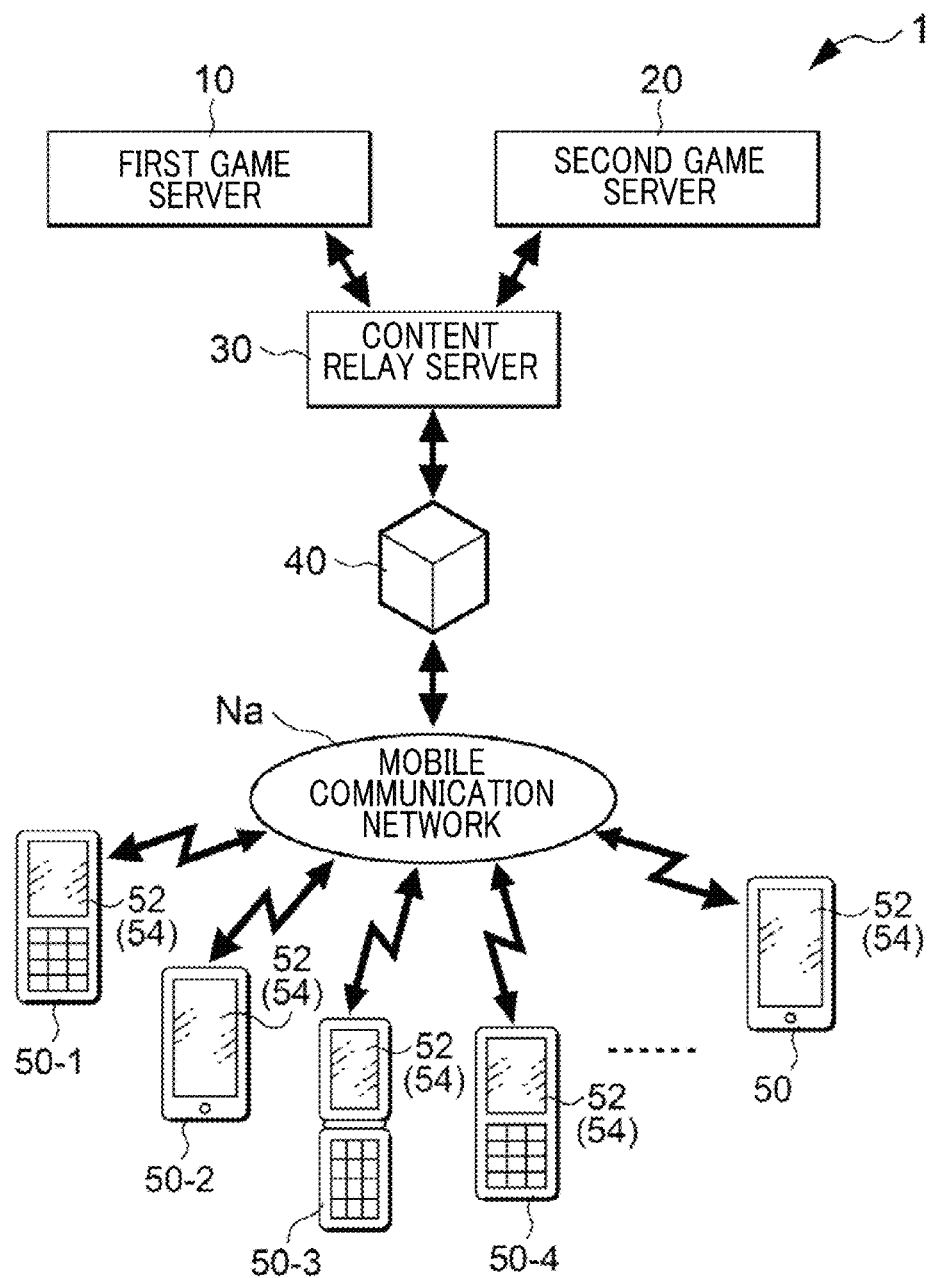
FIG. 1 is a diagram showing an overall configuration of a game system.

In the following, description will be given of an embodiment of the present invention with reference to the drawings.
Overall Configuration FIG. 1 is a diagram showing an overall configuration of a game system 1. As shown in the figure, the game system 1 has a configuration including a first game server 10 and a second game server 20, a content relay server 30, a gateway 40, and plural terminal devices 50. The first game server 10, when a first game is executed at a terminal device 50, transmits and receives various data to and from the terminal device 50 and also manages game data used in the first game. The second game server 20 provides a second game to the plural terminal devices 50.

The first game is a game that is effected through IN and OUT of game values such as medals. In this specification, IN means that a player consumes medals for an entry for participation in a game in a virtually provided game space, and OUT means that medals are dispensed in accordance with a game result. Also, medals are not real medals but are virtual ones used in the game space. Therefore, the first game can be, for example, a slot machine game, Pachinko game, and card game, but in the following description, an example is given of a pusher game that is played as the first game.

On the other hand, the second game is a game, for example, a roulette game, executed based on the ranking in the first game. The details of the second game will be described later in detail.

Both the first game and the second game are provided to members who have registered in a particular SNS.

The content relay server 30 is connected to the first game server 10 and the second game server 20 via a network, but is connected to the terminal devices 50 via the gateway 40 and a mobile communication network Na, whereby the content relay server 30 relays data between the terminal devices 50 and the first game server 10 and between the terminal devices 50 and the second game server 20.

Each of the terminal devices 50 is, for example, a portable telephone, and has a touch panel 54 overlaid on a display unit 52. Each of the terminal devices 50 has installed therein an application program for executing the first game and a browser for viewing web pages for executing the first game and the second game.

The terminal device 50 is not limited to being connected to the mobile communication network Na, but may be configured so that it is connected to a wireless or wired LAN (Local Area Network). In other words, the terminal device 50 is not limited to portable telephones, and it may be a tablet-type computer, a PDA (Personal Digital Assistant), etc., in the case of being connected to a wireless LAN and it may be a stationary personal computer, etc., in the case of being connected to a wired LAN. In the case of being connected to a wireless LAN, the terminal device 50 is configured so that it is connected to a network via a wireless base station (access point), to communicate with the content relay server 30.

Figure 2:
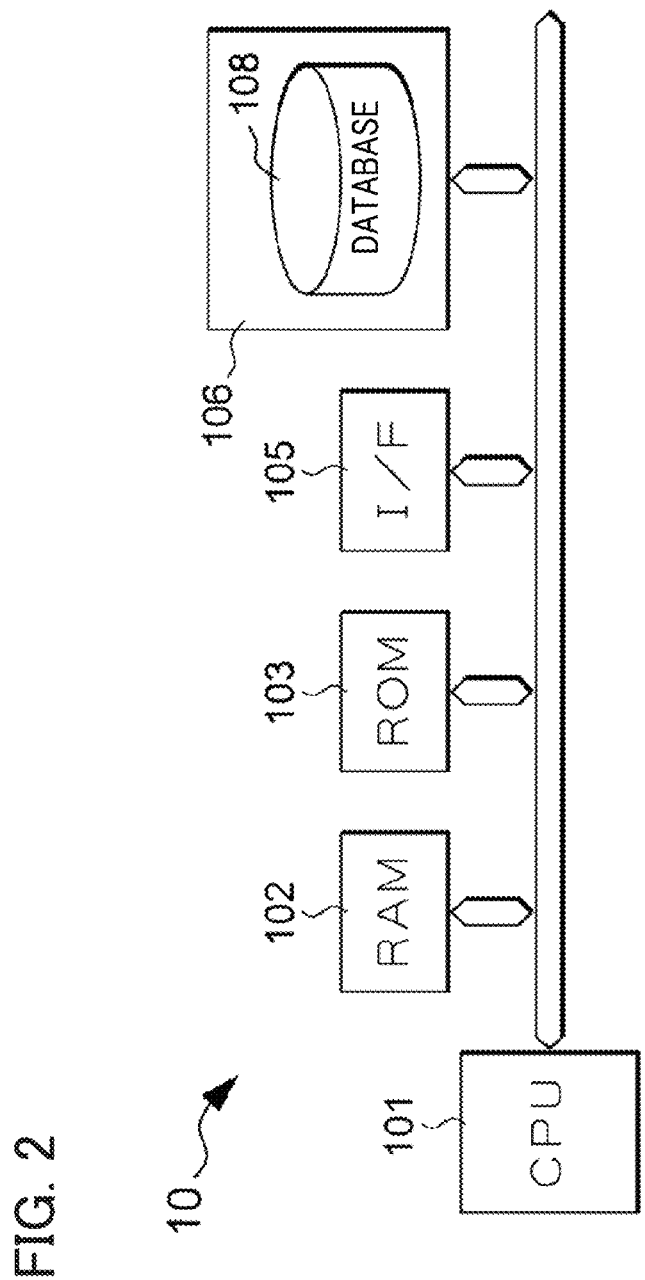
FIG. 2 is a diagram showing a hardware configuration of a first game server of the game system.

FIG. 2 is a block diagram showing a hardware-like configuration of the first game server 10. As shown in this figure, the first game server 10 includes a CPU (Central Processing Unit) 101 for controlling an entire device, a RAM (Random Access Memory) 102 that serves as a main storage device of the CPU 101, a ROM (Read Only Memory) 103 having stored therein a boot program, and an interface (I/F) 105 for communicating via a network, and a storage unit 106 that stores various types of computer programs and data. The storage unit 106 has stored therein a computer program for causing the terminal device 50 to execute downloading, specifically, an application program necessary for the terminal device 50 for executing the first game. The storage unit 106 has stored therein a database 108. In a case in which the first game is a pusher game as described above, data for managing a game machine, i.e., a station, where a pusher game is provided, game data indicating a play state at the game machine, and player data related to a user (player) are managed in the database 108.

The details of the game data and the player data will be described later in detail. The first game server 10 is additionally provided with a real time clock (not shown) that outputs time information.

Figure 3:
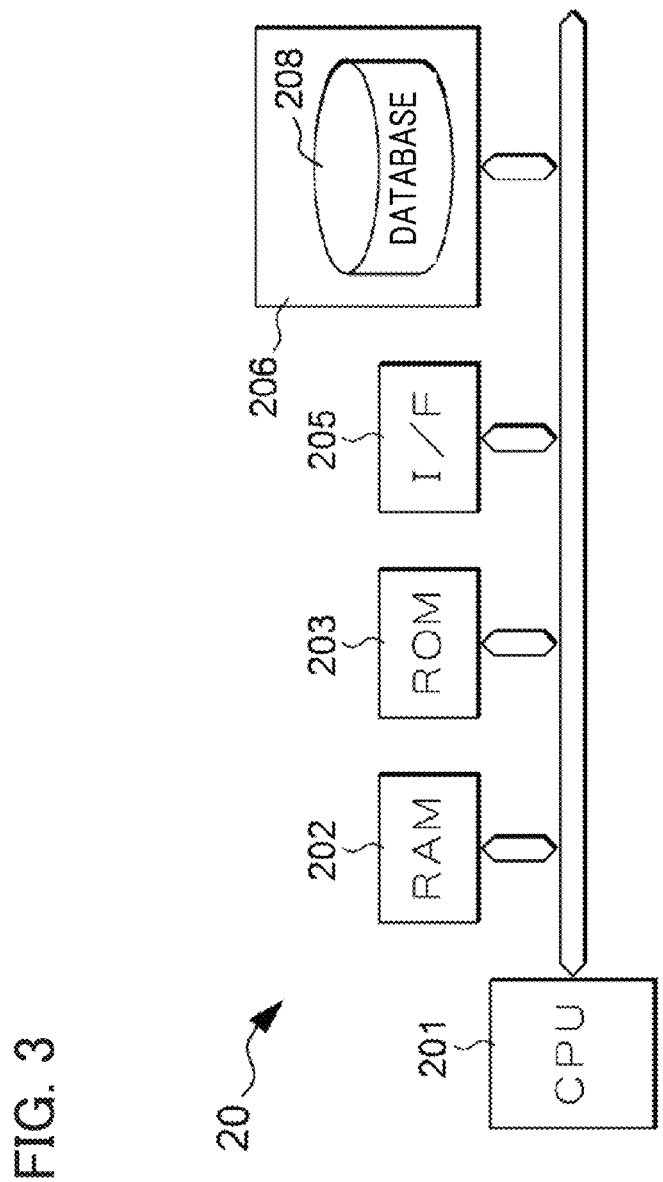
FIG. 3 is a diagram showing a hardware configuration of a second game server of the game system.

FIG. 3 is a block diagram showing a hardware-like configuration of the second game server 20. As shown in this figure, the second game server 20 has almost the same configuration as that of the first game server 10, and includes a CPU 201, a RAM 202, a ROM 203, an interface 205, and a storage device 206 that is a storage unit. The storage device 206 has stored therein a computer program for providing the terminal device 50 with the second game and a database 208. A later-described player table and game table, etc., are managed in the database 208. The second game server 20 is additionally provided with a real time clock (not shown) that outputs time information.

Figure 4:
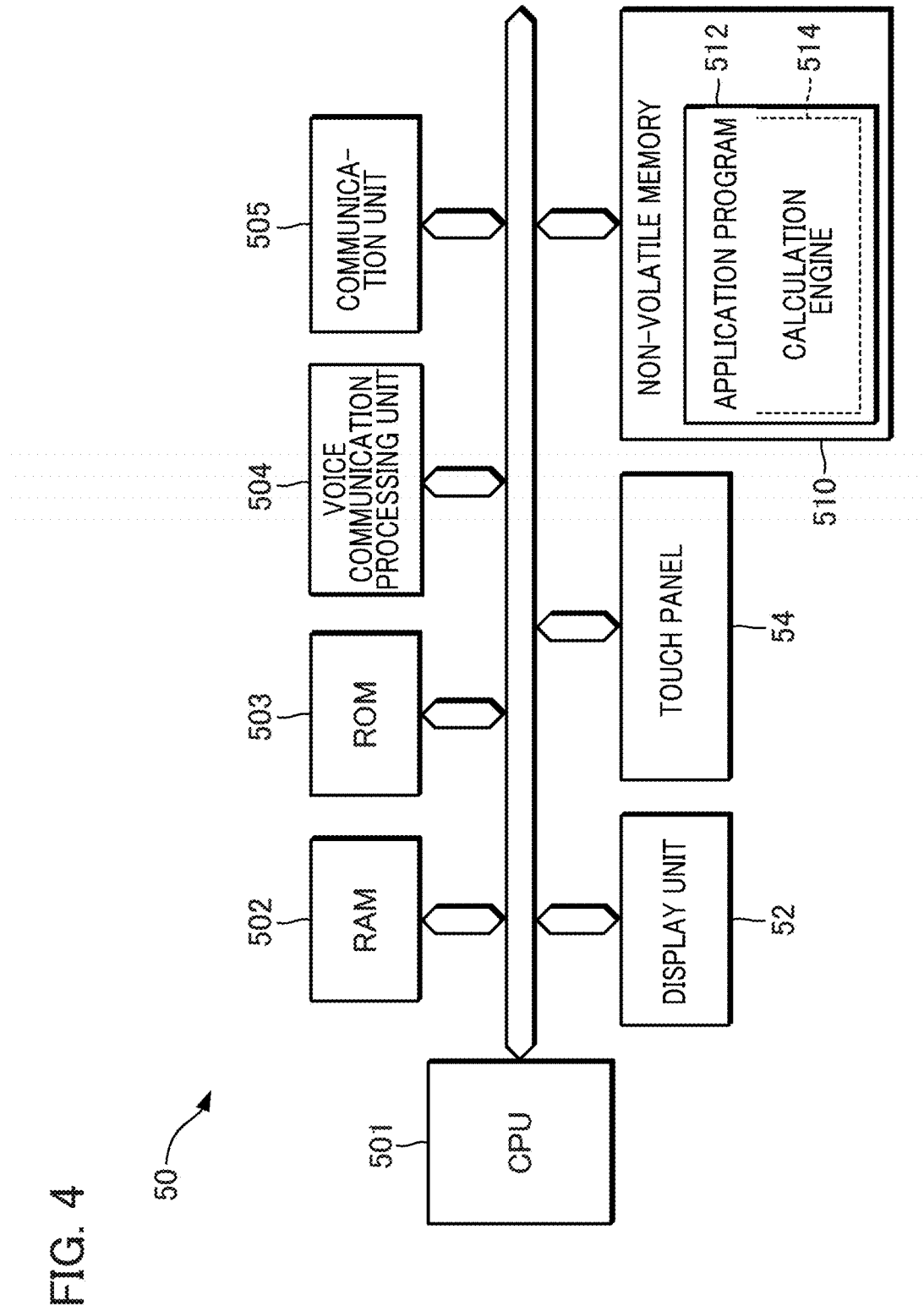
FIG. 4 is a diagram showing a hardware configuration of a terminal device.

FIG. 4 is a block diagram showing a hardware configuration of the terminal device 50. As shown in this figure, the terminal device 50 has a CPU 501, a RAM 502, a ROM 503, a voice communication processing unit 504, a communication unit 505, the display unit 52, the touch panel 54, and a nonvolatile memory 510. The CPU 501 controls each unit of the terminal device 50 by executing various types of computer programs stored in the ROM 503 and in the nonvolatile memory 510. The voice communication processing unit 504 is provided with a microphone, speaker, and speech processing unit, etc., to perform processing related to voice communication. The communication unit 505 communicates with a server via the mobile communication network Na and a wireless LAN network, etc. The display unit 52 is provided with, for example, a liquid display panel and a drive circuit for performing display control thereof.

The touch panel 54, although the detailed explanation thereof is omitted, detects a touch position (XY coordinate values) of a display screen by the display unit 52, to output position information indicating the touch position to the CPU 501. The CPU 501, based on the position information from the touch panel 54, detects a moving direction and a moving speed of the touch position, a type of the touch operation, etc.

The types of detectable touch operations include, for example, tapping, flicking, dragging, pinching, etc. The tapping is an operation of lightly tapping the display screen with a finger. The flicking is an operation of lightly sweeping the display screen with a finger. The dragging is an operation of moving a finger while keeping it in contact with the display screen. The pinching is an operation of widening and narrowing the distance between two fingers while keeping them in contact with the display screen.

The nonvolatile memory 510 has stored therein an application program 512 for causing execution of a pusher game as a video game. The application program 512 has mounted therein a calculation engine 514. The application program 512 is downloaded from the first game server 10, for example, via the mobile communication network Na, a wireless LAN network, etc., for installation in the nonvolatile memory 510.

The application program 512 may be recorded in a memory card, and the like, so that the program is installed in the nonvolatile memory 510 via a slot (not shown) of the terminal device 50, or may be installed in the nonvolatile memory 510 in advance. The application program 512 may be downloaded from a particular site, and not from the first game server 10.

Flow of Overall Game

Figure 5:
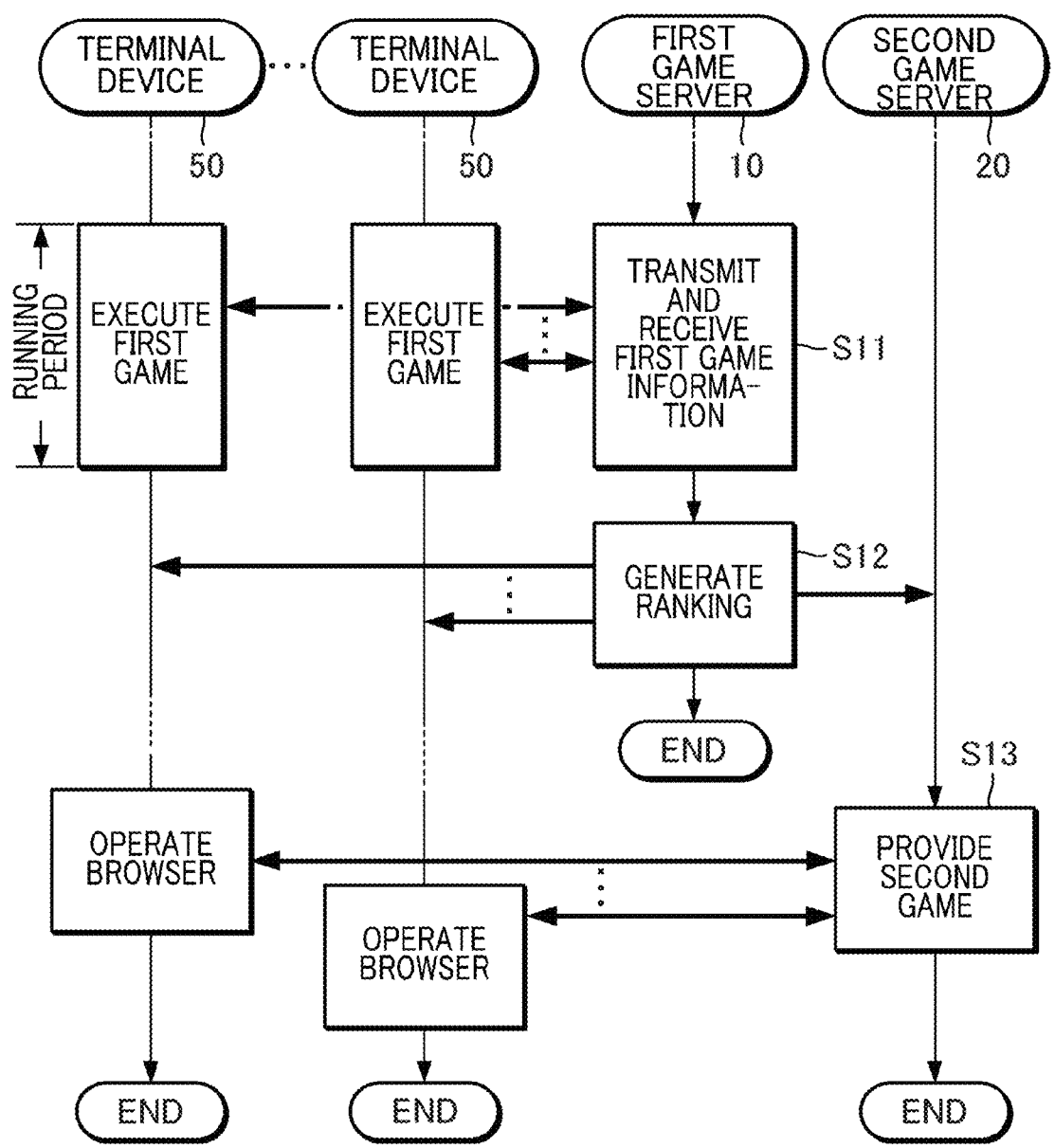
FIG. 5 is a diagram showing an outline flowchart from the first game to the second game.

Description is now given of an overview of a flow of the first and the second games overall in the game system 1 with reference to FIG. 5.

As shown in this figure, players execute the first game respectively at each of the plural terminal devices 50. In this description, the first game is executed in a native type (dedicated application type) in which the dedicated application program 512 installed in the terminal device 50 is executed, to cause the display unit 52 to display a screen on which the real pusher game machine is simulated. The player operates the displayed pusher as if it were a real machine, to win medals. The terminal device 50 at which the application program 512 is executed transmits and receives data to and from the first game server 10 as necessary (Step S11).

The first game has dual characteristics, one of which is a characteristic of simply obtaining medals by the pusher and the other of which is a characteristic of making players compete with the number of medals obtained during a certain running period, for example, a period from five o'clock in the morning of every Monday until four o'clock in the morning six days later (Sunday).

When the running period ends, the first game server 10 generates the ranking of players based on the number of medals acquired during the running period (Step S12). The first game server 10 transmits information on the generated ranking to the terminal devices 50 of players who participated in the first game during the running period and to the second game server 20.

The second game server 20 provides the second game to players who have participated in the first game (Step S13). The second game is executed in a so-called, browser-type in which a player performs a touch operation on a web screen displayed on the display unit 52 of the terminal device 50, data of this operation is transmitted to the second game server 20, and in which the second game server 20 generates a web screen in response to the operation, to return the web screen to the terminal device 50, for display on the display unit 52.

Description will next be given of details from the first game to the second game. First, description will be given of the pusher game as the first game.

First Game

Figure 6:
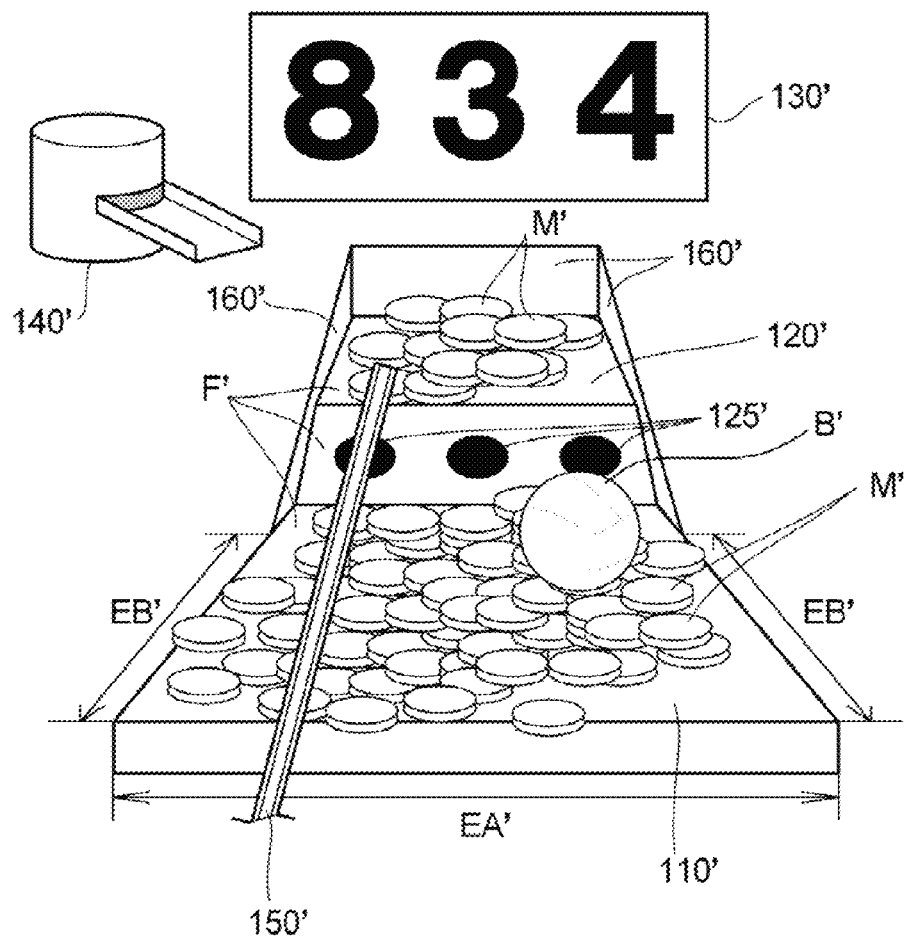
FIG. 6 is diagram for explaining the summary of the first game.

FIG. 6 is an explanatory diagram for explaining the summary of the pusher game.

It is to be noted that, for the sake of convenience, description is given of a real machine of a pusher game installed at a game arcade, etc. A real machine of the pusher game is configured by one or more stations (tables) provided for one body, and the game is executed in a unit of stations. FIG. 6 shows a table for one station.

In this figure, a main table 110' is an approximately horizontally fixed, plate-shaped member. A pusher table 120' is a truncated pyramid shaped member placed on the main table 110', and moves reciprocatingly, repeatedly, for example, at a certain moving speed, in the front-back direction when viewed from a player who positions in the front side in the figure.

A slope is formed on the front edge (the front side in the figure) of the pusher table 120', and the slope is provided with three medal checkers 125' that detect a medal M'. Each medal checker 125' has a circular detection window which is slightly smaller than the shape of the medal M', so as to output a medal detection signal when the medal M' slips down the slope in such a way that covers the entire portion of the detection window.

Also, when a medal detection signal output by any one of the medal checkers 125' is detected, a lottery game is performed. The lottery game is, for example, a slot game that determines whether a combination of three patterns is lined up to match a predetermined winning combination, and display related to the slot game is performed on a lottery pattern display unit 130'. That is, a series of display effects since the variable display of three patterns (symbols) is started until the patterns are stopped is performed on the lottery pattern display unit 130'.

In a case in which a predetermined winning combination is hit in the lottery game, i.e., when in the lottery pattern display unit 130', the combination of three patterns after the variable display is stopped is lined up, for example, in "777", a predetermined number of medals M' is supplied from a medal supplier 140' onto a field F'. Also, in a case in which the three patterns lined up are a combination other than "777", a predetermined number of balls B' is supplied from a supplying unit (not shown) onto the field F'. The field F' is configured by the top surface (a flat plane and the slope) of the pusher table 120' and the top surface of the main table 110'. Prearranged on the field F' are plural medals M' and balls B' placed at random. Supplied onto the field F' are medals M' supplied from the medal supplier 140' and medals M' loaded by a player into a medal inlet called a medal shoot, etc. In inserting a medal M', a player can adjust the position of the front end of a medal feeding rail 150' by operating the medal inlet. The medal M' inserted by the player into the medal inlet is guided to the position designated by the player by means of the medal feeding rail 150' and drops from the front end of the medal feeding rail 150', to be supplied on the field F'.

The three sides excluding the front side in the figure of the pusher table 120' are surrounded by walls 160'. The lower portion of the wall 160' on the deep side in the figure is provided with a concave portion. When the pusher table 120' moves to the back side in the figure, the major portion of the pusher table 120' excluding the front edge portion (the slope) is accommodated in the concave portion. Therefore, from among the medals M' inserted by the player into the medal inlet and the medals M' supplied from the medal supplier 140', the medals M' supplied to the top surface (the flat plane) of the pusher table 120' are forced out by the back side wall 160' when the pusher table 120' moves toward the back side in the figure, to slip down the slope of the pusher table 120' and drop onto the main table 110'. When one of the medal checkers 125' outputs a medal detection signal, the lottery game is started.

Also, from among the medals M' loaded by the player into the medal inlet and the medals M' supplied from the medal supplier 140' and the balls B' supplied from the supplying unit, the medals M' supplied to the back side in the figure of the main table 110' (within the movable range of the pusher table 120') and the medals M' and balls B' having slipped down from the top surface of the pusher table 120' are forced out by the pusher table 120' when the pusher table 120' moves toward the front side in the figure. With this configuration, the pileups take place among a large number of medals M', and the medals M' and balls B' that are on the peripheral edge of the main table 110' drop off from the main table 110'. The edge portions of the main table 110' from which the medal M' can drop off are divided into two invalid edges EB' located at the right and left of the figure and one valid edge EA' located on the front side of the figure. The medals M' having dropped from the valid edge EA' are paid out to the player. The medals M', etc., having dropped from the invalid edges EB' are, so-called, "Oyaochi", and are not included to the amount paid out to the player.

In a case in which a large number of medals M' is supplied from the medal supplier 140' such as a case in which the predetermined winning combination is hit in the lottery game, walls protrude outside the two invalid edges EB' so that the medals M' do not drop off from the invalid edges EB'. In some cases, items such as a special medal differing from the normal medal M' and a ball are supplied onto the field F'. The special medal has a shape and color differing from the normal medal M'. When the special medal is caused to drop off from the valid edge EA', a predetermined number of medals M' is supplied onto the field F', for example, from the medal supplier 140. When an item other than the medal, for example, a ball B', is caused to drop off from the valid edge EA', a lottery game different from the slot game (a lottery game played by using a ball such as a roulette game, bingo game, etc.) is performed.

The above-described application program 512 is to execute such a pusher game as a video game at the terminal device 50. Also, the calculation engine 514 mounted on the application program 512 performs physical calculation using, for example, each of the following elements as parameters, to simulate the movement of the pusher table and the movement of each single medal on the field. Accordingly, at the terminal device 50, a real game image can be generated and displayed on the display unit 52.

(1) the size, shape, thickness, weight, and friction coefficient of medals;
(2) the size, shape, thickness, weight, friction coefficient, position, and moving speed of the pusher table;
(3) the size, shape, and friction coefficient of the main table;
(4) the position of the tip portion of the medal feeding rail; and
(5) gravity.

In this simulation, medal information such as position coordinates and tilt (angle) information of every medal on the field is updated every time in accordance with the movement of each medal, and the medals and the pusher table arranged based on the updated medal information are displayed on the display unit 52 frame by frame.

Although the description is omitted herein, the same applies to the balls on the field.

Figure 7:
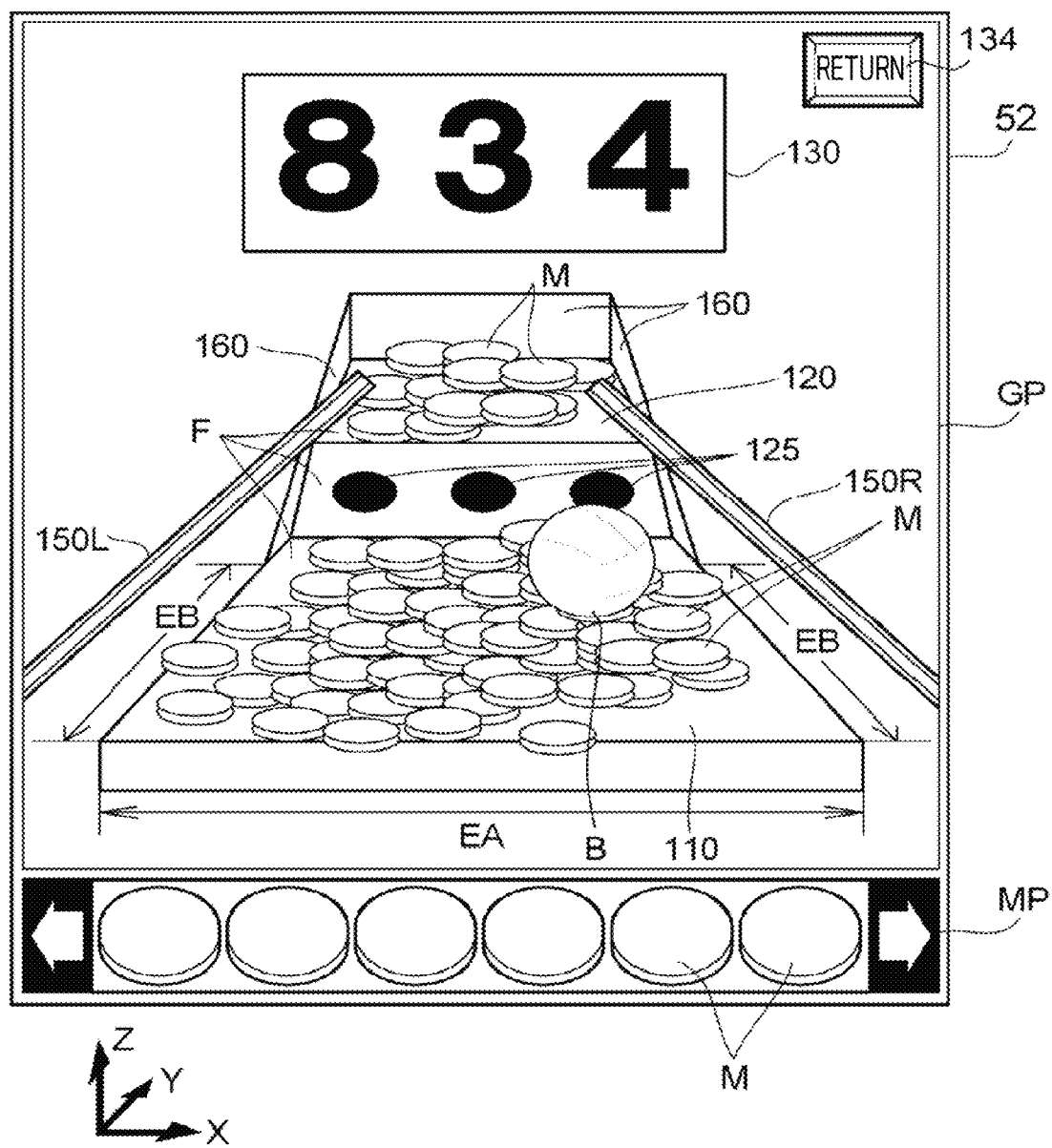
FIG. 7 is a diagram showing a display example of the first game at a terminal device.

FIG. 7 is a diagram showing a screen display example of the pusher game executed at the terminal device 50.

Displayed on the display unit 52 are, for example, a game image GP in the upper portion and a medal array image MP in the lower portion. The game image GP represents a state of plural medals M and balls B on a field F, a pusher table 120, etc. More specifically, on the game image GP, for example, the images of a main table 110, the pusher table 120, three medal checkers 125, the plural medals M and balls B on the field F, an area 130 where the lottery patterns are displayed, right and left two medal feeding rails 150R and 150L, a wall 160, etc., are displayed.

The image of the medal supplier 140' is not displayed as the game image GP, but in such a case in which the predetermined winning combination is hit in the lottery game, a large number of medals M is supplied onto the field F. The balls B are supplied likewise. Also, a player can use the right and left two medal feeding rails 150R and 150L, thereby to insert the medal M onto the field F. On the other hand, a button 134 for ending the pusher game is displayed on the game image GP.

On the other hand, as the medal array image MP, the medals M, for example, six medals at maximum, that can be loaded on the field F are displayed, lined up in the right and left direction.

In this display, if the total number of medals held by a player is six or more, the medal array image MP in which six medals M are lined up is displayed. If the total number of medals held by a player is five or fewer, the medal array image MP in which the remaining number of medals M is arranged is displayed. Therefore, a player is able to know from the medal array image MP that only a few of the stock of medals are remaining.

A player is given a predetermined number of medals (for example, 100 medals) as medal holdings when the player plays the first game for the first time. When the medal M is obtained in the pusher game, the medal holdings increments by the number of medals obtained.

At the terminal device 50, the CPU 501 executes a game process for the pusher game, generates the game image GP according to a result of the process, to cause the display unit 52 to display the generated game image GP. The game process for the pusher game includes, for example, each of the following (1) to (5) processes:

(1) a process of arranging (setting positions) of the medal M in accordance with the position and the angle indicated by the medal information;
(2) a process of calculating continuously changing position of the pusher table 120 and continuously changing position of each medal M on the field F by using the calculation engine 514;

(3) a process of determining the number of the medals M loaded on the field F and a medal feeding rail to be used based on a touch operation to the medal array image MP;
(4) a process of changing the position of the medal feeding rail 150R, 150L through a touch operation; and
(5) a process for the lottery game.

Although the description of the game process for the ball B is omitted herein, the position of the ball B on the field and the movement of the ball B are processed in the same way.

Next, before the flow of the process in the pusher game is described, description will be given of a configuration and data necessary for the process.

Figure 8:
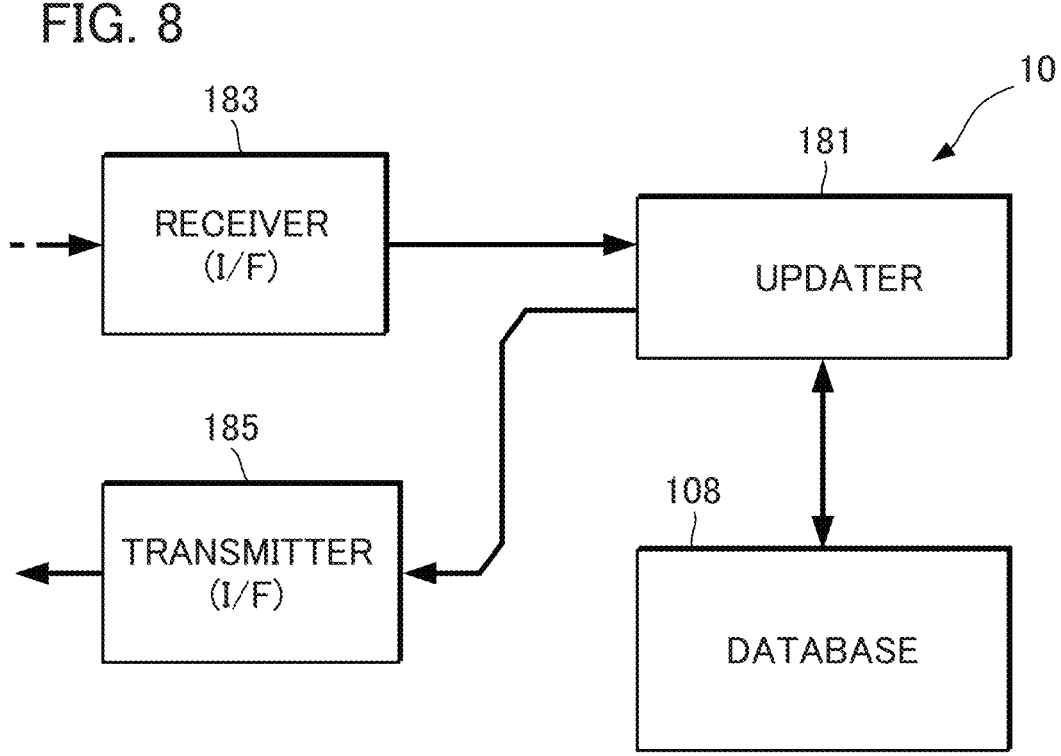
FIG. 8 is a diagram showing functional blocks configured in the first game server.

FIG. 8 is a diagram showing functional blocks configured when the CPU 101 in the first game server 10 manages a first game. As shown in this figure, in the first game server 10, an updater 181 is configured by the execution of a predetermined management program. The management program may be stored in a recording medium. If such a recording medium is used, the management program may be installed, for example, in the first game server 10, which is a computer. The recording medium having stored thereon the management program may be non-transitory. The non-transitory recording medium is not limited to a particular type, but may be a recording medium such as a CD-ROM.

The updater 181 updates game data corresponding to a station providing the pusher game in the database 108, and controls a locked state of station depending on communication and time. The updater 181 also has a function of generating update history of the database 108. A receiver 183 and a transmitter 185 correspond to the interface 105 (refer to FIG. 2), which is a hardware element, but are shown as separate functional blocks, for convenience.

Figure 9:
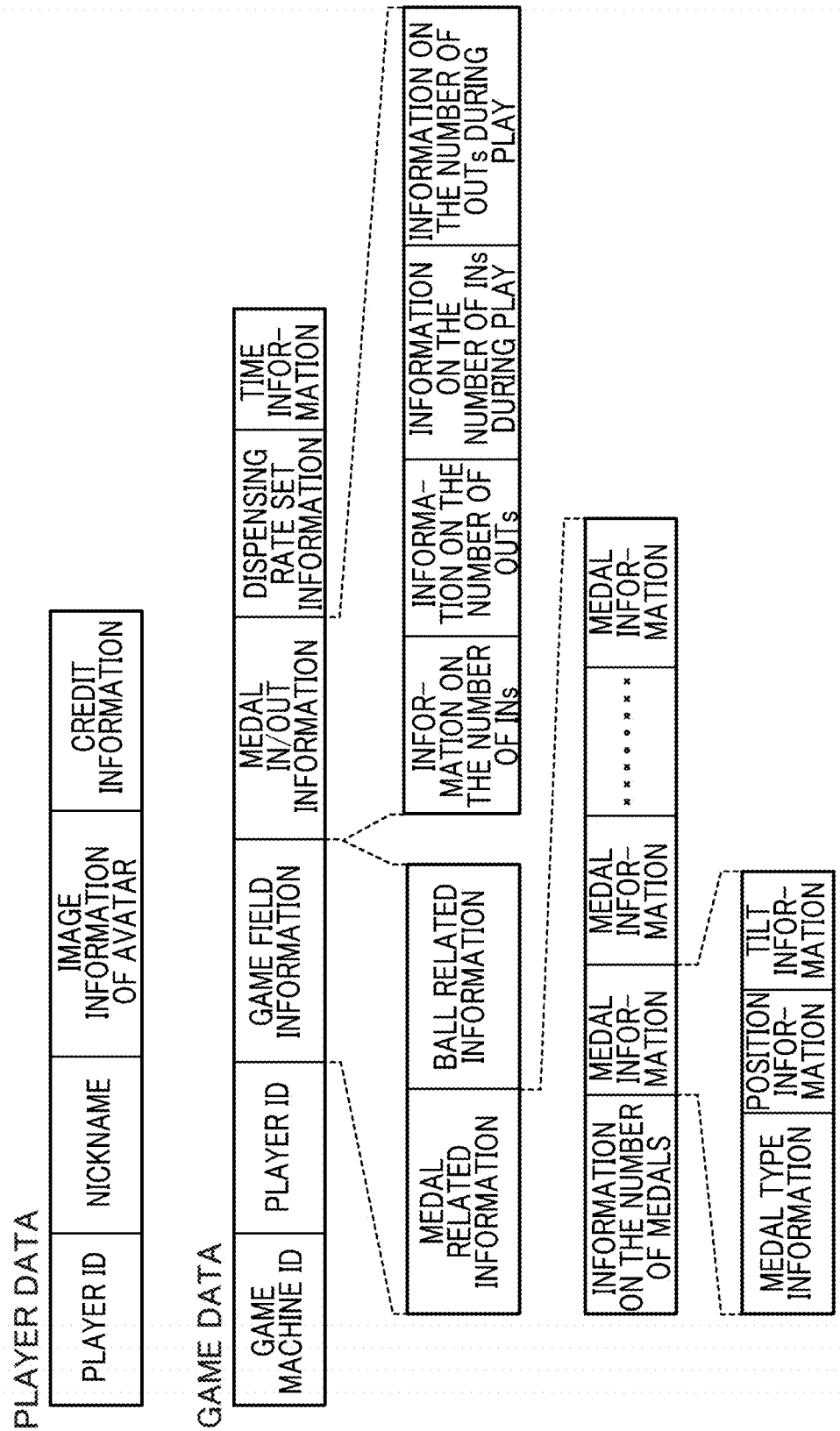
FIG. 9 is a diagram showing data configuration used in the first game.

FIG. 9 is a diagram showing a configuration of player data and game data.

First, the player data is managed in the database 108 of the first game server 10, and is a table having associated with one another a player ID uniquely identifying a player who plays a game at the terminal device 50, the nickname of the player (whichever real name or false name), image information of an avatar as a representation of the player, and credit information corresponding to the player. Among them, the credit information is information indicating the number of medals, as game values, owned by a player in the present description. The credit information decreases (is consumed) as an exchange for a play by the player, and increases when the medals are paid out depending on a result.

When the ranking is generated (described later), a concept called "the number of medals obtained" is used. The number of medals obtained means information indicating how much the number of medals indicated by the credit information has increased since the start until the end of the running period. Therefore, the base for the number of medals obtained is the credit information, and the number of medals obtained is generated by referring to and separating the credit information into periods.

Also, in the example of the figure, only a piece of player data for one player is shown. However, in actuality, the player data is provided for each player who has registered as a member in the particular SNS.

The game data is managed in the database 108 of the first game server 10. When a game is played at a terminal device 50, game data corresponding to the game is transmitted to the terminal device 50. The terminal device 50 updates the game data in accordance with the game progress, and returns the game data to the first game server 10 at the end of the game. The database 108 is then updated in the first game server 10.

Such game data is a table having associated with one another a game machine ID, a player ID, game field information, medal IN/OUT information, dispensation rate set information, and time information.

Among the above, the game machine ID is, in the present description, a piece of information uniquely identifying a station at which the pusher game is provided. As for the player ID, when a station corresponding to the game machine ID is being used, i.e., when the game is being played, the player ID of a player playing at this station is registered. Therefore, if a player ID is registered in the game data, it indicates that the station is used for a play by a player corresponding to the player ID. It also indicates that no other player is allowed to play a game corresponding to the game data. On the other hand, if no player ID is registered in the game data, it indicates that the station is vacant, i.e., no player is playing at the station.

The game field information is collected pieces of information necessary for determining the arrangement for all the medals M and balls B on the field F of the pusher game. Specifically, information for the arrangement of the medal M on the field F is defined by medal related information, and information for the ball B is defined by ball related information.

The medal related information includes information on the number of medals indicating the number of the medals M existing on the field F, and medal information indicating the arrangement points, etc., of the respective medals M existing on the field F. The medal information additionally defines medal type information indicating the color, pattern, diameter, thickness, and price per unit of the medal M, position information indicating a point at which the medal M is arranged on the field F and tilt information with respect to the face of the field F. The position information defines three dimensional coordinates (xyz coordinates) of a center of the medal M when the center is viewed from, for example, a reference point that is pre-set on the face of the field F (the left end point of the front side in FIG. 7). The tilt information defines how much the circular plate of the medal M has rotated, for example, with respect to a reference direction preset on the face (the xy plane) of the field F (for example, the y direction extending from the front side to the deep side in FIG. 7), and also defines how much the circular plate of the medal M has tilted with respect to the face of the field F.

At the terminal device 50, when the medal M is loaded on the field F in the game progress, medal information corresponding thereto is added, and when the medal M drops off from the field F, medal information corresponding thereto is deleted. The information on the number of medals is not necessarily required because the number of medals can be counted by the number of pieces of medal information. The description and drawing are omitted for the ball related information because it has the same configuration as for the medal related information.

The medal IN/OUT information includes information on the number of INs, information on the number of OUTs, information on the number of INs during play, and information on the number of OUTs during play. The information on the number of INs is information indicating the number of medals loaded in the pusher game from the past up to the present, and the information on the number of OUTs is information indicating the number of medals paid out in the pusher game up to the present. The information on the number of INs during play is information indicating the number of medals loaded in the pusher game currently being played, and information on the number of OUTs during play is information indicating the number of medals paid out in the pusher game currently being played.

The dispensing rate set information is information indicating a ratio of the number of OUT medals to the number of IN medals (dispensing rate, or pay-back rate). The odds of the winning combination in the lottery game and the odds of "Oyaochi", for example, are defined based on this rate. The time information is information indicating the latest time at which this record was accessed.

In the game data shown as an example, the player ID is associated to the game machine ID, but the association between the game machine ID and the player ID may be managed in a separate table. Even if they are managed in a separate table, it is still possible to determine whether a station corresponding to the game machine ID is used for a play or is vacant depending on whether the player ID is registered or not.

Also, in the shown example, only the game data for a single station of the pusher game is shown. In the imaginary space where the pusher game is provided, plural game shops (or venues) are set up, and a pusher game machine configured of plural stations are installed at each game shop. For this reason, the game machine ID is associated with a game shop and a pusher game machine in actuality, although this is not shown.

For the sake of convenience for explanation, the game data is configured as shown in FIG. 9, but, as described above, the game data is data indicating a game state that changes in accordance with the game progress. Therefore, the game data is sometimes used to simply indicate either or both of the game field information and the medal IN/OUT information.

Figure 10:
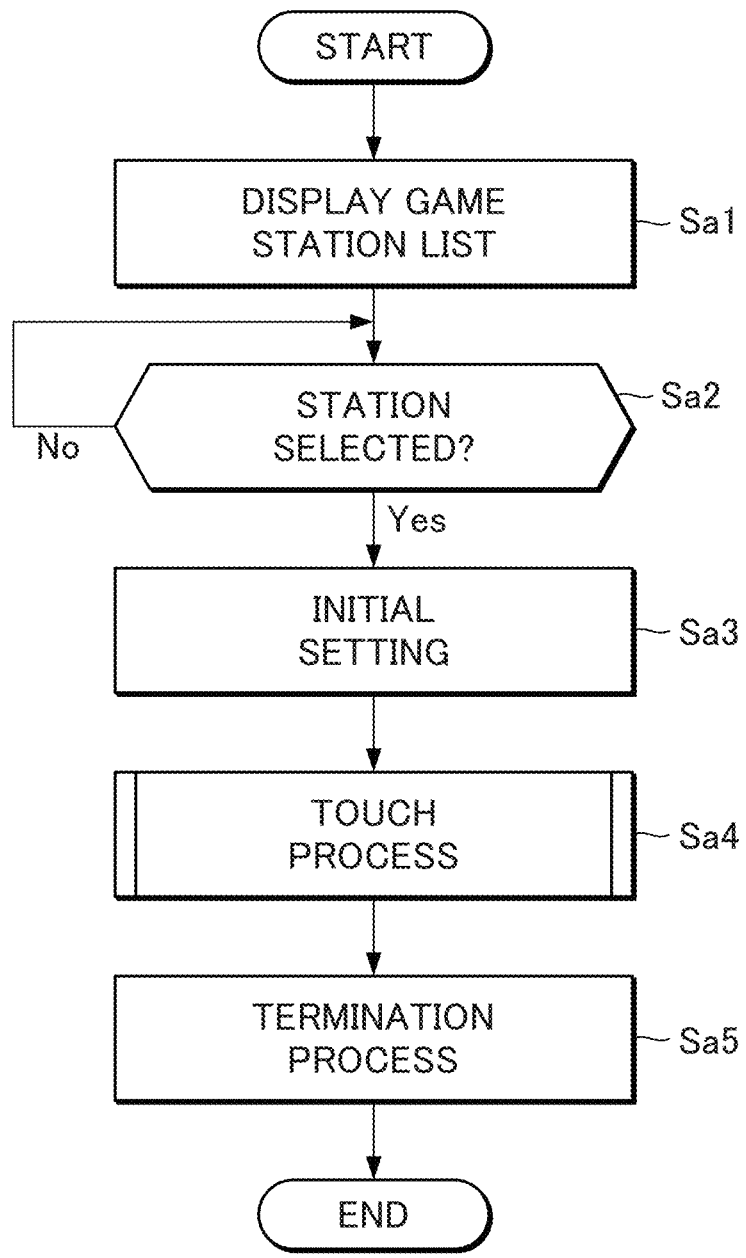
FIG. 10 is a flowchart showing the flow of the first game at a terminal device.

Description will be next given of an operation in which the pusher game as the first game is executed at the terminal device 50. FIG. 10 is a flowchart showing a flow of a process at the terminal device 50 by which the pusher game is executed.

First, when a player activates the application program 512 to start the play of the pusher game at the terminal device 50, the terminal device 50 first causes a game station list display screen to be displayed in the following manner (Step Sa1).

Specifically, first, the CPU 501 of the terminal device 50 transmits an access request to the first game server 10. In response, the first game server 10 transmits, to the terminal device 50, map data indicating the locations of virtual game shops. Second, the CPU 501, based on the map data, causes the display unit 52 to display a map in which the plural game shops are arranged and a message prompting the user to select a game shop that the player wishes to visit. Third, when a game shop is selected by the player, the CPU 501 transmits information on the selected game shop to the first game server 10. Fourth, the first game server 10 transmits to the terminal device 50, out of the game data of a game machine ID associated with the selected game shop, the information on the player ID and the information on the number of medals in the game field information in particular. If the information on the player ID is registered, the first game server 10 obtains the nickname and the image information of an avatar associated with the player ID by referring to the player data, for transmission to the terminal device 50. Fifth, having received these pieces of information, the terminal device 50 causes the display unit 52 to display a game station list display screen giving a summary of each station set up in the game shop selected by the player.

Figure 13:
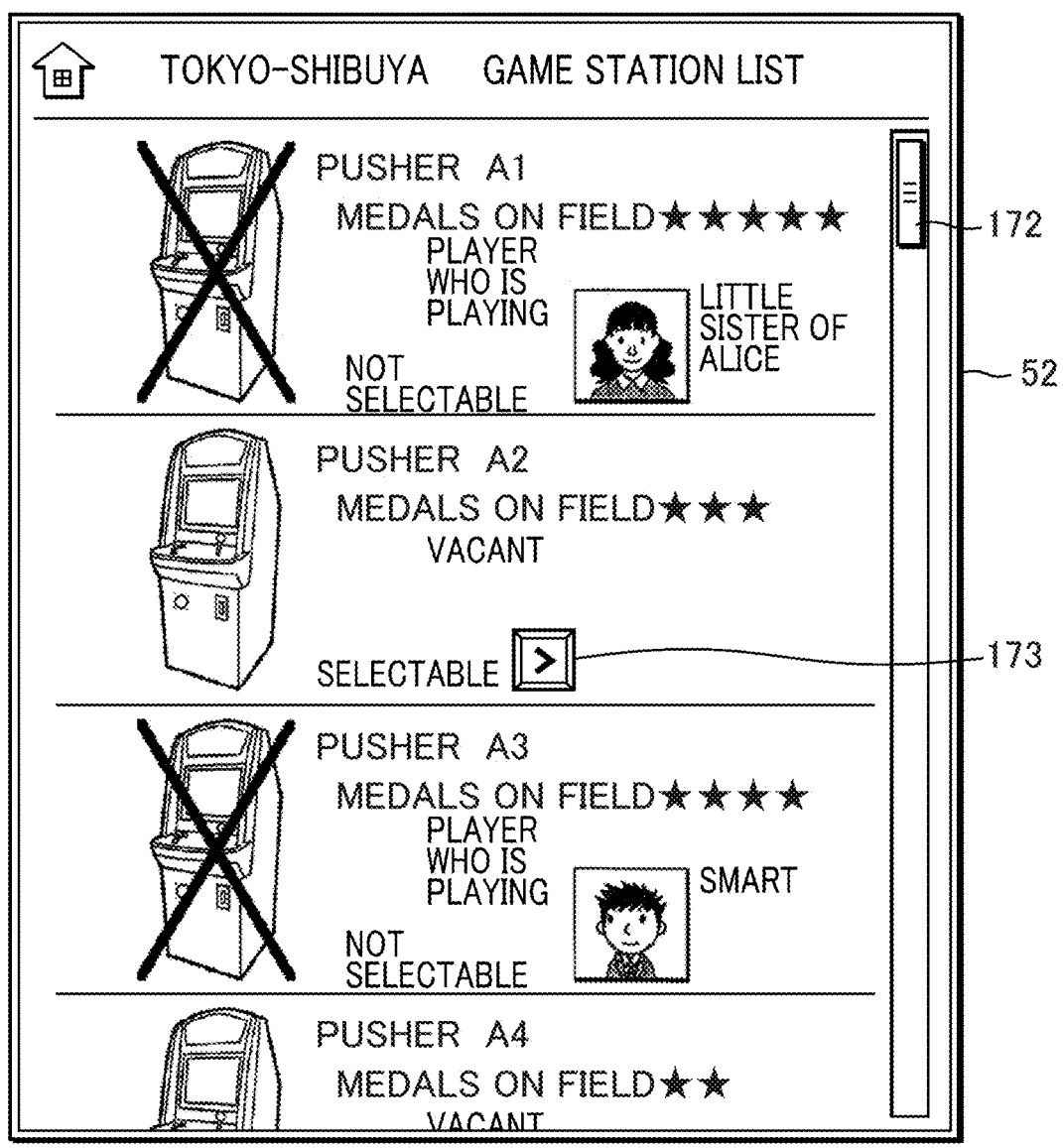
FIG. 13 is a diagram showing an example of a game station list screen.

FIG. 13 is a diagram showing an example of such a game station list screen. The example shows a case in which a game shop called "Tokyo-Shibuya" is selected by a player, and the summary of game stations in the select game shop is displayed in a list. In this example, the number of medals existing on the field F of each station is indicated at one of five levels by the number of stars "★".

Also, for a station at which another player has already been playing, a cross, "×", indicates that the station is not selectable (i.e., the station is locked), and the nickname and the avatar of the player are displayed. On the other hand, for a station that is vacant, an indication that the station is selectable is displayed, together with a button 173 for instructing the selection of the station.

Moving a slide bar 172 or an operation such as flicking to a list display portion, for example, scrolls the screen upwardly or downwardly.

With such a list screen, a player is able to know whether each station installed at a selected game shop is being played at or is vacant, the nickname and the avatar of the player if the station is being played at, and the number of medals existing on the field F of each station in the same way as for the real pusher game machine, thereby enabling selection of a station to play. Therefore, a player is able to select a station (i.e., a game to play) at the terminal device 50, with the knowledge of respective play states (game states) of plural stations (i.e., plural games). In particular, because the differences in game states among plural games are substantial in the pusher game, the selection of the game before play is crucial. Accordingly, the number of medals existing on the field F, i.e., the game field information is presented as a game state.

The game station list screen does not have to be generated by the terminal device 50, and instead, for example, it may be configured so that the first game server 10 generates a web screen for transmission to the terminal device 50, and so that the terminal device 50 causes the display unit 52 to display the web page through a browser.

Reference is again made to FIG. 10. The CPU 501 determines whether any one of the stations is selected in the game station list display screen (Step Sa2). If no station is selected (if a determination result in Step Sa2 is NO), the processing procedure returns to Step Sa1. Thus, the game station list display will continue until a station is selected.

It may be configured so that, if a predetermined operation is performed, a screen may be reverted to a screen prompting the selection of a game shop, which is one step before.

On the other hand, in the game station list display screen, if one of the selectable stations is selected (if a determination result in Step Sa2 is YES), an initial setting process such as the following will be performed (Step Sa3).

In a case in which a vacant station is selected by the player, the CPU 501 of the terminal device 50 for which the selected operation has been performed transmits data identifying the selected station to the first game server 10. In the first game server 10, the updater 181 having received the data via the receiver 183 registers a player ID corresponding to the player of the terminal device 50 as the information on player ID corresponding to the game machine ID of the game data piece of the selected station from among pieces of game data in the database 108. Through this process, that the station is being played at by the player of the terminal device 50 is registered, i.e., the station (i.e., the game) is set to the locked state. Thereafter, the selection of the station (i.e., the play of the game) by another player is prohibited.

Also, the updater 181 transmits to the terminal device 50 via the transmitter 185 the duplicates of the registered player ID, the game field information, the medal IN/OUT information, and the dispensation rate set information out of the game data piece including the game machine ID of the selected station, and the duplicate of credit information out of a player data piece including the player ID.

On the other hand, the CPU 501 of the terminal device 50 arranges each medal M at a point on the field F with an angle defined respectively by pieces of medal information of the received game field information (medal related information), i.e., the medals M are displayed on the display unit 52. Likewise, the CPU 501 arranges each ball B at a point on the field F with an angle defined respectively by pieces of ball information of the received game field information.

As a result, at the terminal device 50, the medals and the balls for the selected station are restored to a state of a time point at which the previous play ended. The display example of the display unit 52 is shown in the above-described FIG. 7.

Furthermore, the CPU 501 of the terminal device 50 sets the received medal IN/OUT information and credit information in a predetermined area in the RAM 502. Additionally, the CPU 501 of the terminal device 50 sets, for example, the odds of winning combinations in the lottery game and the odds of "Oyaochi" in a game played from that time on so as to match the dispensation rate defined in the received dispensation rate set information.

After the initial setting is performed, a touch process in response to a touch operation the touch panel 54 is performed (Step Sa4).

Figure 11:
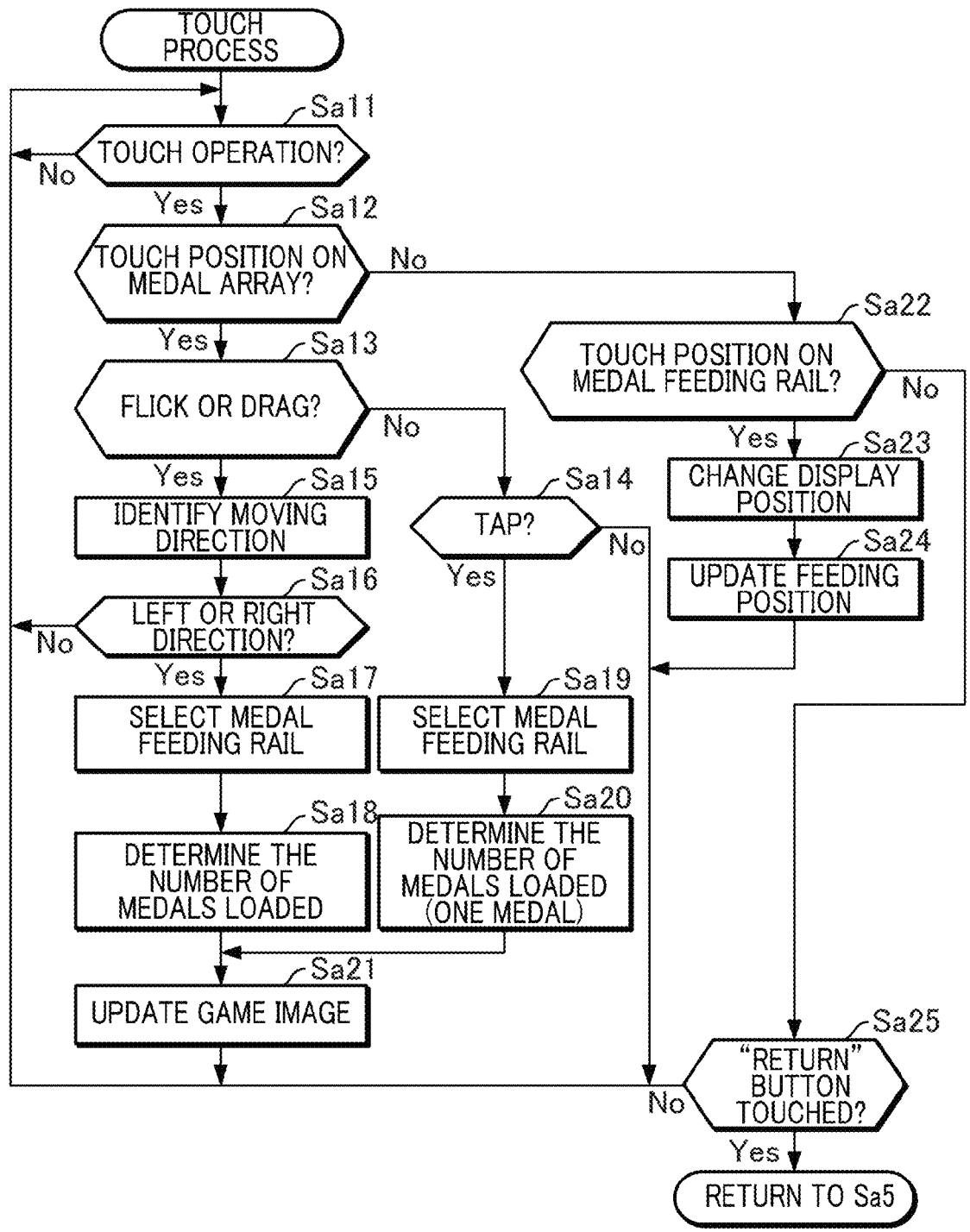
FIG. 11 is a diagram showing the flow of a touch process in the first game.

FIG. 11 is a flowchart showing the touch process in more detail.

First, the CPU 501 detects whether a touch operation has been performed on a screen (the touch panel 54) displayed on the display unit 52 (Step Sa11). Because a result of the determination in Step Sa11 continues to be NO unless a touch operation is performed, the processing procedure will loop the Step Sa11. On the other hand, when a touch operation is performed, a result of the determination becomes YES in Step Sa11, and the following processes of Step Sa12 to Sa25 are performed in accordance with the touch operation.

It is to be noted, in actuality, during a period in which the processing procedure is in the loop of Step Sa11, the process for the reciprocating movement of the pusher table 120 (calculation and display), the updating process of the medal related information along with the displacements of the medals (calculation and display), and the updating process of ball related information along with the displacements of the balls (calculation and display) are executed in parallel (timewise) with Step Sa21 (described later), but such a representation is omitted in FIG. 11.

When the touch operation is performed, the CPU 501 determines whether the touch position is on the medal array image MP (Step Sa12). The nonvolatile memory 510 has stored therein, as range information indicating a display area for the medal array image MP, for example, the upper-left XY coordinates values and the lower right XY coordinates values as diagonal coordinates defining the display area of the medal array image MP. The CPU 501 checks whether the XY coordinate values of the operation are included in the rectangular area indicated by the range information, to determine whether the touch position is on the medal array image MP.

In a case in which a result of the determination in Step Sa12 is YES, the CPU 501 determines the type of the touch operation (Step Sa13, Sa14). Because the touch panel 54 detects the touch position, to output the position information thereof to the CPU 501 one after another, the CPU 501 obtains, based on the pieces of position information, a moving locus of the touch position and the rapidity of change in the touch position. Also, the CPU 501 determines, based on the moving locus of the touch position, the type of the touch operation such as flicking, dragging, tapping, etc.

When the type of the touch operation is flicking or dragging (when a result of the determination in Step Sa13 is YES), the processing procedure advances to Step Sa15. When the type of the touch operation is tapping (when a result of the determination in Step Sa13 is NO, and a result of the determination in Step Sa14 is YES), the processing procedure branches off to Step Sa19.

Figure 14A:
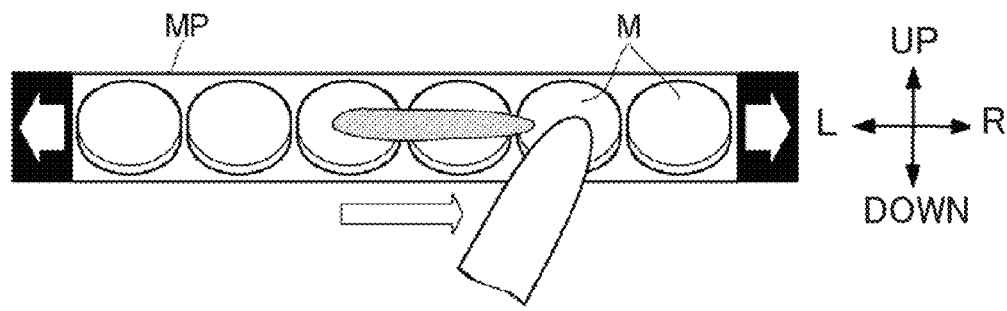
FIG. 14A is a diagram showing a specific example of a touch operation (dragging) on a medal array image.
Figure 14B:
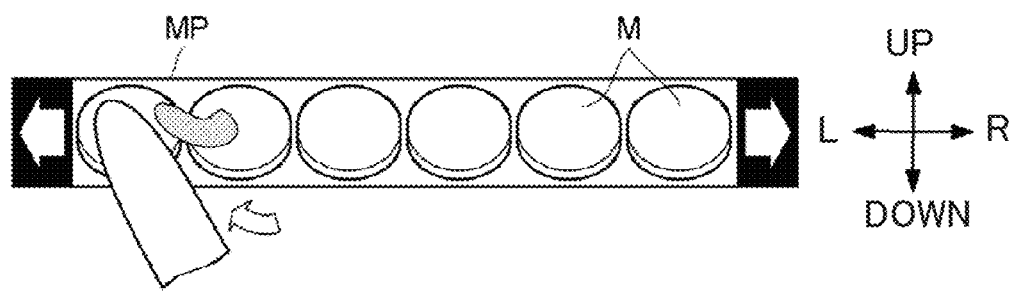
FIG. 14B is a diagram showing a specific example of a touch operation (flicking) on a medal array image.
Figure 14C:
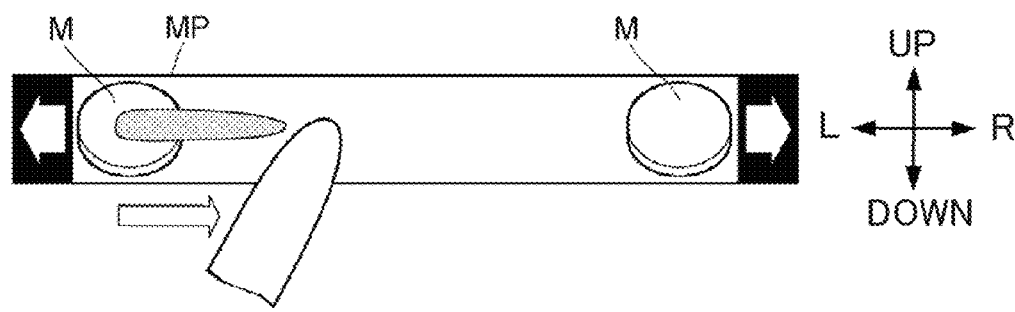
FIG. 14C is a diagram showing a specific example of a touch operation (dragging) on a medal array image.

When the type of the touch operation is flicking or dragging, the CPU 501 identifies the moving direction of the touch position (Step Sa15). For example, when the player performs a dragging operation such as shown in FIG. 14A, the CPU 501 identifies the moving direction of the touch position being the right direction. Also, when the player performs a flick operation such as shown in FIG. 14B, the CPU 501 determines that the moving direction of the touch position is the left direction. In FIGS. 14A, 14B, and 14C, a portion indicated by hatching is the moving locus of the touch position.

After that, the CPU 501 determines whether the identified moving direction of the touch position is the right direction or the left direction (Step Sa16). The CPU 501, when the moving direction of the touch position is neither the right nor left direction (when a result of the determination in Step Sa16 is NO), for example, when the moving direction of the touch position is straight up or straight down, determines that the touch operation is invalid, returns to Step Sa11, and waits for the next touch operation.

On the other hand, when the moving direction of the touch position is either the right direction or the left direction (when a result of the determination in Step Sa16 is YES), the CPU 501, based on the moving direction of the touch position, selects a medal feeding rail used for loading the medal M (Step Sa17). Specifically, when the moving direction of the touch position is the right direction, the CPU 501 selects the medal feeding rail 150R on the right side, and when the moving direction of the touch position is the left direction, the CPU 501 selects the medal feeding rail 150L on the left side.

Subsequently, the CPU 501 determines the number of the medals M loaded based on the touch position (Step Sa18). Specifically, the CPU 501, on the medal array image MP, determines, with the starting point of the touch position as a reference, all the medals M that are in the moving direction of the touch position from the starting point as the medals M to be loaded on the field F. Therefore, for example, in the case of FIG. 14A, the number of the medals M loaded is determined to be four, and in the case of FIG. 14B, the number of the medals M loaded is determined to be two.

Thus, when the player performs the drag operation shown in FIG. 14A, the CPU 501 determines to load four medals M by using the medal feeding rail 150R on the right side. When the player performs the flick operation shown in FIG. 14B, the CPU 501 determines to load two medals M by using the medal feeding rail 150L on the left side.

On the other hand, for example, in a case in which the total number of medals held by the player are two, as shown in FIG. 14C, the medal array image MP in which each of the two medals M is respectively placed on both ends is displayed. Also in this case, the CPU 501, based on the moving direction of the touch position, selects a medal feeding rail, and determines, with the starting point of the touch position as a reference, all the medals M that are in the moving direction of the touch position from the starting point as the medals M to be loaded on the field F. Therefore, for example, when the player performs a dragging operation such as shown in FIG. 14C, the CPU 501 determines to load two medals M by using the medal feeding rail 150R on the right side.

In FIG. 14A to FIG. 14C, the medal M located at the starting point of the touch position may be excluded from the number of medals loaded. When the medal M at the starting point is excluded, in the operation of FIG. 14A, the number of medals loaded is determined to be three, and in FIG. 14B and FIG. 14C, the number of medals loaded is determined to be one. Also, in the above example, the number of medals loaded is determined with the starting point of the touch position as a reference, but the middle point between the starting and the end points of the touch position, etc., may be used instead of the starting point of the touch position.

In any case, in Step Sa18, the CPU 501 increments the information on the number of INs during play and the information on the number of INs of the medal IN/OUT information set to the RAM 505 by the determined number of medals to be loaded, and decrements the set credit information by the same number.

Figure 15A:
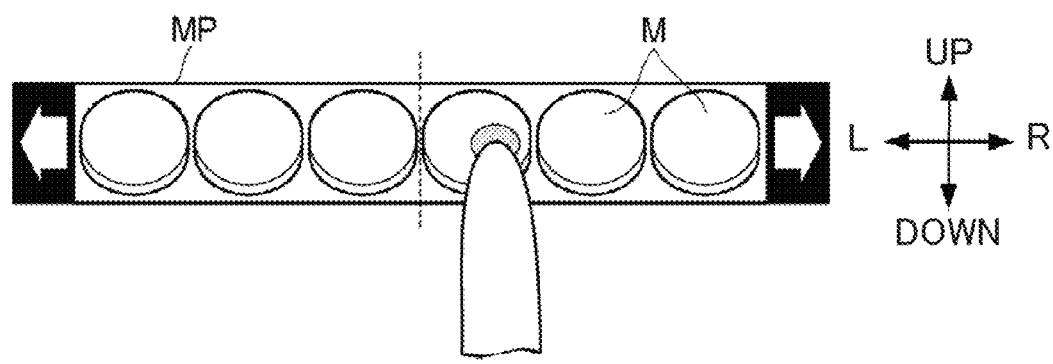
FIG. 15A is a specific example of a touch operation (tapping) on a medal array image.
Figure 15B:
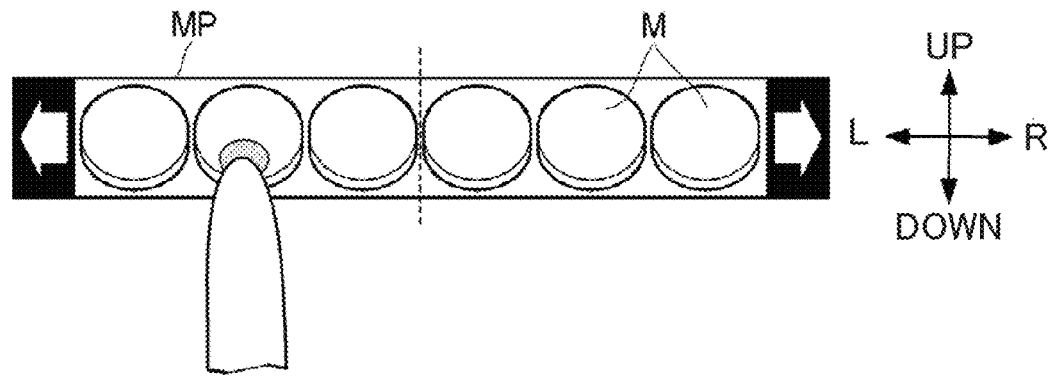
FIG. 15B is a specific example of a touch operation (tapping) on a medal array image.

On the other hand, when the type of the touch operation is tapping (when a result of the determination in Step Sa14 is YES), the CPU 501 selects the medal feeding rail based on the touch position (Step Sa19). Specifically, the CPU 501, when tapping is made to a portion to the right of the center line of the medal array image MP, selects the medal feeding rail 150R on the right side, whereas, when tapping is performed to a portion to the left of the center line, the CPU 501 selects the medal feeding rail 150L on the left side. For example, the CPU 501, when tapping is performed as shown in FIG. 15A, selects the medal feeding rail 150R on the right side, whereas when tapping is performed as shown in FIG. 15B, selects the medal feeding rail 150L on the left side. In the case of the tap operation, the CPU 501 determines, regardless of the touch position, the number of medals M loaded to be one (Step Sa20).

That is, when the player performs the tap operation shown in FIG. 15A, the CPU 501 determines to load one medal M by using the medal feeding rail 150R on the right side. Also, when the player performs the tap operation shown in FIG. 15B, the CPU 501 determines to load one medal M by using the medal feeding rail 150L on the left side.

In any case, in Step Sa20, the CPU 501 increments the information on the number of INs during play and the information on the number of INs by the determined number of medals to be loaded, "1", and decrements the set credit information by the same number.

After Step Sa18 or Sa20, the CPU 501 executes an update process of the game image GP in relation to the loading of the medal M (Step Sa21). For example, when the player performs the drag operation shown in FIG. 14A, the CPU 501 generates the game image GP of loading four medals M on the field F by using the medal feeding rail 150R on the right side, and causes the display unit 52 to display the generated game image GP. Also, when the player performs the tap operation of FIG. 15B, the CPU 501 generates the game image GP of loading one of the medals M on the field F by using the medal feeding rail 150L on the left side, and causes the display unit 52 to display the generated game image GP. In this update process, the CPU 501 calculates the coordinates of a dropping point of each medal M loaded on the field F by using the calculation engine 514.

Also, in this update process, if there is any medal M that drops off from the valid edge EA, the CPU 501 increments the information on the number of OUTs during play and the information on the number of OUTs of the set IN/OUT information by the number of medals having dropped, and increments the set credit information by the same number.

It is to be noted that, even if there is any medal M that drops off from the invalid edge EB, because the medal M is invalid, the number of the medals is not added to the information on the number of OUTs during play, to the information on the number of OUTs, or to the credit information.

In any case, because, the medal M having dropped is no longer on the field F, medal information corresponding to the medal is deleted from the medal related information. The same applies to the ball M having dropped off from the valid edge EA or from the invalid edge EB.

Thus, the CPU 501, when the position of the touch operation is on the medal array image MP, determines, based on the position of the touch operation and the moving direction, etc., the number of the medals M to be loaded and a medal feeding rail to be used, and executes a process of loading the determined number of medals M on the field F immediately after the determination. Therefore, the loading timing of the medal M is determined by a touch operation to the medal array image MP.

When the touch position of the touch operation is determined to be not on the medal array image MP (when a result of the determination in Step Sa12 is NO), the CPU 501 determines whether the touch position is on the image of the medal feeding rail 150R or 150L (Step Sa22). The nonvolatile memory 510 has stored therein range information indicating a display area for the medal feeding rail 150R on the right side and range information indicating a display area for the medal feeding rail 150L on the left side. The CPU 501, by comparing these two pieces of range information with the XY coordinate values of the touch position, can determine whether the touch position is on the image of either the medal feeding rail 150R or 150L.

Figure 16:
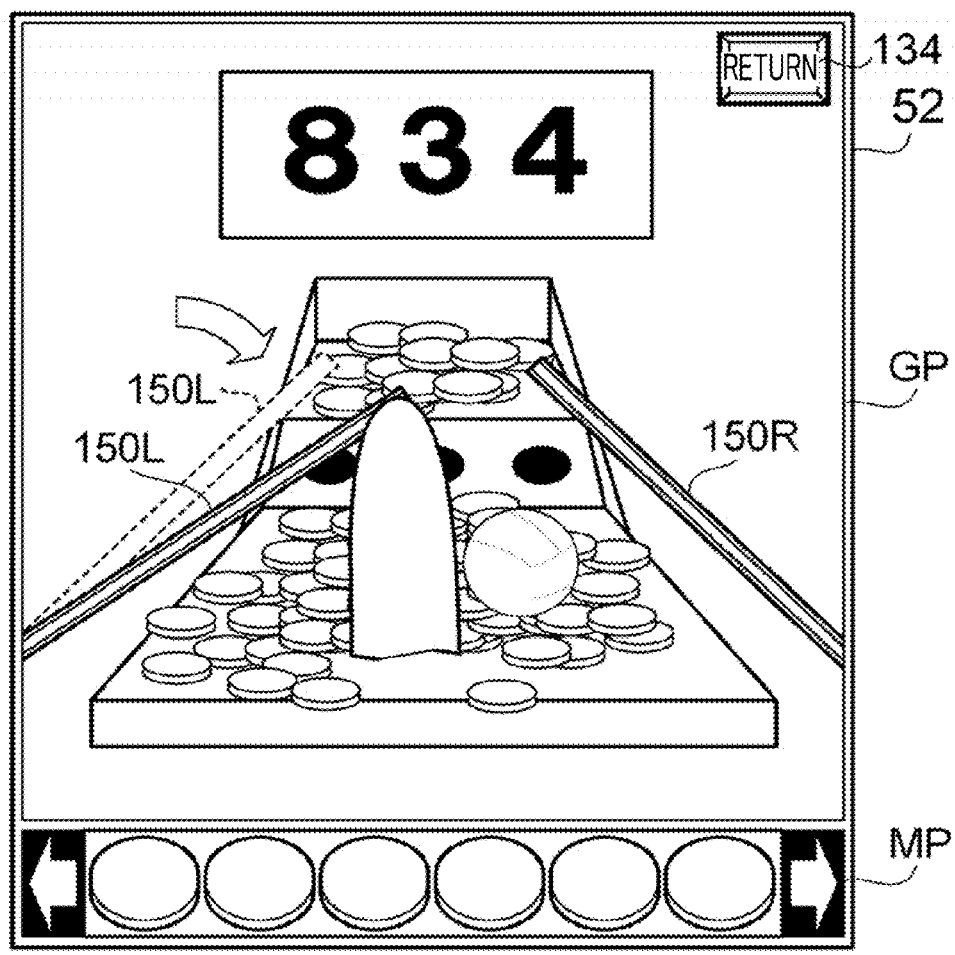
FIG. 16 is an explanatory diagram for the case of changing the position of a medal feeding rail.

In a case in which a result of the determination in Step Sa22 is YES, the CPU 501 changes, in accordance with the touch operation, the display position of the image of the medal feeding rail 150R or 150L, and updates the range information of the medal feeding rail display having moved along with the change in its position (Step Sa23). If the touch position is on the image of the medal feeding rail 150R on the right side, the CPU 501 changes the display position of the medal feeding rail 150R on the right side, and when the touch position is on the image of the medal feeding rail 150L on the left side, the CPU 501 changes the display position of the medal feeding rail 150L on the left side. For example, as shown in FIG. 16, if the player touches the tip portion of the medal feeding rail 150L on the left side (shown in a dashed line in the figure) and performs a drag operation toward a diagonally down-right direction, the display position of the medal feeding rail 150L on the left side is changed to the position shown in the solid line in the figure. Also, in the example of FIG. 16, the CPU 501 updates the range information on the medal feeding rail 150L on the left side stored in the nonvolatile memory 510 with the change in the display position of the medal feeding rail 150L on the left side.

The change in the display position of the medal feeding rail 150R or 150L is not limited to what is caused by the drag operation. For example, tapping the tip portion of the medal feeding rail 150L on the left side may enable the selection of the medal feeding rail 150L on the left side as the rail for which the display position is to be changed, and the display position of the medal feeding rail 150L on the left side may be changed so that the tip portion is located at a position where the player subsequently taps. Also, the touched portion is not limited to the tip portion of the medal feeding rail 150R or 150L, the display position of the medal feeding rail 150R or 150L can be changed by performing a touch operation to a freely selected portion if the touched portion is on the image of the medal feeding rail 150R or 150L.

Subsequently, the CPU 501 updates the position of the tip portion of the medal feeding rail for which the display position has been changed, i.e., the information on the loaded position of loading the medal M onto the field F (Step Sa24). The nonvolatile memory 510 has stored therein loaded position information (the right side) indicating the position of the tip portion of the medal feeding rail 150R on the right side, and loaded position information (the left side) indicating the position of the tip portion of the medal feeding rail 150L on the left side. For example, in a case in which the CPU 501 changes the display position of the medal feeding rail 150L on the left side, the CPU 501, based on the display position of the medal feeding rail 150L on the left side which has been changed, changes the loaded position information (the left side) stored in the nonvolatile memory 510. As described above, the position (loaded position) of the tip portion of the medal feeding rail 150R, 150L is used as one of the parameters in calculating the coordinates of the dropping point of the medal M loaded on the field F by using the calculation engine 514.

The CPU 501 returns the processing procedure to Step Sa11, and waits for a next touch operation in a case in which a result of the determination in Step Sa14 becomes NO due to the type of the touch operation corresponding to none of the flicking, dragging, nor tapping, a case in which the update process of the game image in Step Sa21 is completed, or a case in which the update process of the loaded position in Step Sa24 is completed.

On the other hand, in a case in which the touch position is neither on the medal array image MP nor on the image of the medal feeding rail 150R or 150L (results of determinations in both Steps Sa12 and Sa22 are NO), the CPU 501 determines whether the touch position is on the display image of the button 134 (Step Sa25). When a result of the determination thereof is NO, the CPU 501 determines that the touch operation is invalid, returns the processing procedure to Step Sa11, and waits for a next touch operation.

On the other hand, when a result of the determination of Step Sa25 is YES, this touch process ends, and the processing procedure advances to Step Sa5 in FIG. 10.

In Step Sa5, the CPU 501 executes a termination process such as in the following. That is, the CPU 501 transmits a termination notification containing the current player ID, game field information, medal IN/OUT information and credit information to the first game server 10. The CPU 501 then terminates the execution of the application program 512.

On the other hand, at the first game server 10, when the termination notification from the terminal device 50 is received by the receiver 183, the updater 181 overwrites (updates) the game field information and the medal IN/OUT information of game data corresponding to the player ID of the player of the terminal device 50 in the database 108 with the game field information and the medal IN/OUT information contained in the termination notification.

Also, the updater 181 updates the credit information of play data corresponding to the player ID of the player of the terminal device 50 in the database 108 with the credit information contained in the termination notification.

Furthermore, the updater 181 updates the time information with the current time indicated by the real time clock. The updater 181 also deletes the player ID stored in the information on player ID in the game data, whereby the station becomes vacant, i.e., the locked state is ended. Thereafter, the selection of the station by another player is permitted. Thus, the updater 181 of the first game server 10 sets a game played at one of the terminal devices 50 to be in a locked state (Step Sa3), thereby prohibiting the play of the game at another of the terminal devices, and the updater 181 discontinues the locked state of the game when the game ends at the terminal device 50 (Step Sa5), thereby permitting the play of the game at another of the terminal devices. That is, when the pusher game is played at the station at the terminal device 50, the play of the pusher game at the station by another terminal device 50 is prohibited. Therefore, the same pusher game at the same station is never simultaneously played at different terminal devices 50, and as a result, inconsistencies in the game data can be avoided.

Thus, in the first game, game data corresponding to a station which is a game machine and credit information corresponding to a player who plays at the station are managed in the database 108 of the first game server 10. When a game is played by a player at the terminal device 50, game data corresponding to the game and credit information corresponding to the player are transmitted to the terminal device 50. It is configured so that the terminal device 50 updates the game data and the credit information in accordance with the game progress, and returns the updated game data and credit information to the first game server 10 when the game is terminated, so that the database 108 is updated. Thus, the terminal device 50 is able to start a game from a game state indicated by the piece of the game data received from the first game server 10. Also, because the updater 181 updates game data stored in the database 108 of the storage unit 106 and corresponding to the game data received from the terminal device 50, the first game server 10 is able to manage game data having reflected game states corresponding to the progress of the game from its start until its end.

What is to be considered in such a configuration is that there is a possibility that a communication state between the first game server 10 and the terminal device 50 that was in a normal state at the start of the game has changed to a disconnection state at the end of the game for some reason, that there is a possibility that an abnormality occurs at the terminal device 50, resulting in the interruption in the progress of the pusher game, etc.

Specifically, because a station corresponding to the game is set to the locked state at the start of the game, the occurrence of communication disconnection or abnormality at the terminal device 50 in the midst of the play cause inconvenience that the locked state of the station cannot be ended and that another player is not allowed to play the game at the station.

Accordingly, in the present description, when the pusher game is being played as the first game, the terminal device 50 periodically (i.e., at a predetermined interval) transmits the player ID, the game field information, the medal IN/OUT information and the credit information (hereinafter, sometimes referred to as "game data, etc.") updated in accordance with the game progress. The first game server 10, depending on whether it receives the game data, etc., periodically (i.e., at a predetermined interval), controls the locked state of a station corresponding to the game.

Figure 12:
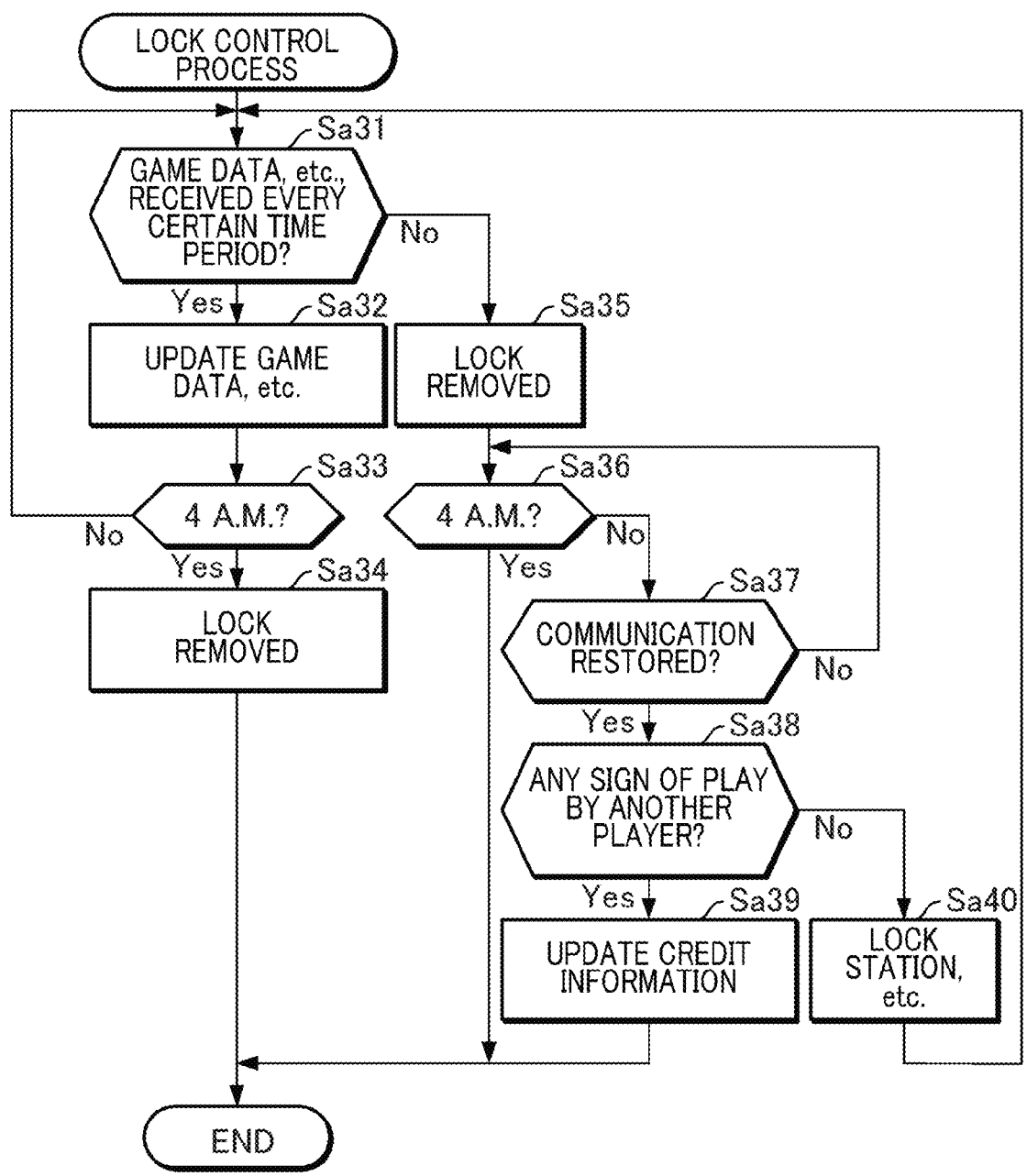
FIG. 12 is a flowchart showing a lock control process in the first game server.

FIG. 12 is a flowchart indicating a lock control process. The lock control process is executed, when the pusher game is started using a station at a terminal device 50, with respect to a pair of the terminal device 50 and the station. In other words, when the lock control process is executed, because the pusher game has been started using a station at a terminal device 50, it is presupposed that the station is already in the locked state.

First, the updater 181 determines whether it has received, from the terminal device 50 of a pair for which the lock control process is performed, game data, etc., corresponding to the station of the same pair before a certain time period has elapsed (Step Sa31). The start of the certain time period is a time at which the station of the pair entered into the locked state, or a timing at which Step Sa31 was executed the last time. There are two occasions at which the station enters into the locked state: one is when the pusher game using the station is started, and the other is when the station is locked in Step Sa40 (described later).

If the updater 181 has received game data, etc., from the terminal device 50 (if a result of the determination in Step Sa31 is YES), the communication is in a normal state. Accordingly, the updater 181 updates in the database 108, the game field information and the medal IN/OUT information of game data corresponding to a player ID (the received player ID) of the terminal device 50 for which the lock control process is being executed, respectively with the received game field information and medal IN/OUT information, and updates credit information of player data corresponding to the player ID, with the received credit information (Step Sa32). In this way, because the game data is updated at the predetermined interval in addition to the timing at which the game is ended, the game data stored in the storage unit 106 is caused to be in a state reflecting the progress of the game. Furthermore, the updater 181 updates the time information with the current time indicated by the real time clock.

Subsequently, the updater 181 determines whether the current time has reached four o'clock in the morning (Step Sa33). In this description, one hour from four o'clock in the morning every day is assigned as a maintenance period for data. For this reason, if the current time has reached four o'clock in the morning (if a result of the determination in Step Sa33 is YES), the updater 181 forcibly removes the locked state of the station of the pair for which the lock control process is executed (Step Sa34). After that, the lock control process for this pair ends.

On the other hand, if the current time has not reached four o'clock in the morning (if a result of the determination in Step Sa33 is NO), the processing procedure returns to Step Sa31.

If game data, etc., is not received from the terminal device 50 of a pair for which the lock control process is executed before a certain time period has elapsed, the game data, etc., corresponding to the station of the same pair (if a result of determination in Step Sa31 is NO), communication disconnection or abnormality at the terminal device 50 has taken place. Accordingly, the updater 181 removes the locked state of the concerned station (Step Sa35). In this way, because the locked state of the station is discontinued, the game can be played at the station using another terminal device 50.

The updater 181 then determines whether the current time has reached four o'clock in the morning (Step Sa36). If the current time has reached four o'clock in the morning (if a result of the determination in Step Sa36 is YES), because the locked state of the station is ended in Step Sa35, the lock control process of the concerned pair immediately ends.

On the other hand, if the current time has not reached four o'clock in the morning (if a result of the determination in Step Sa36 is NO), the updater 181 determines whether communication with the terminal device 50 has been restored where the game was being played at the station for which the locked state was ended in Step Sa35 (Step Sa37). The communication having been restored means having received game data, etc., from the terminal device 50. If the game data, etc., is not received from the terminal device 50 (if a result of the determination in Step Sa37 is NO), the processing procedure returns again to Step Sa36. Accordingly, until game data, etc., is received from the terminal device 50 where the game was being played at the station for which the locked state was removed in Step Sa35, or the current time reaches four o'clock in the morning, the processing procedure loops Steps Sa36 and Sa37.

When game data, etc., is received from the terminal device 50 (when a result of the determination in Step Sa37 is YES), the updater 181 determines if there is any sign of another player having played using the station during a communication disconnection period since the locked state of the station was removed in Step Sa35 due to not receiving the game data, etc., until the game data, etc., was received in Step Sa37 (Step Sa38).

When the locked state of the station is removed in Step Sa35, another player might have started a play using the station after the removal at another terminal device 50. In a case in which another player has started a play using the station at another terminal device 50, the game data, etc., of the station in the database 108 is updated, at the first game server 10, in accordance with the game progress of a game played by another player.

On the other hand, at the terminal device 50 where communication has been restored, there is possibility that a game was progressing over the communication disconnection period using the same station (because the station is virtual). Therefore, if the database 108 is updated with the game data, etc., transmitted from the terminal device 50 for which the communication has been restored, inconsistencies will be caused with the game data, etc., (the field information, in particular) updated in relation to the play by another player.

Accordingly, in the present description it is configured so that, when game data, etc., is received from the terminal device 50 for which communication had been disconnected (when a result of the determination in Step Sa37 is YES), and if there is any sign of another player having played at the station in the communication disconnection period, the updater 181 protects a play result of the other player with priority. That is, the updater 181, from among the game data, etc., it has received from the terminal device 50 for which the communication has been restored, does not reflect the game field information and the medal IN/OUT information in the database 108. However, the updater 181 updates the credit information corresponding to the player ID (Step Sa39). Thus, the credit information is updated in accordance with the changes in the amount of credit during the communication disconnection period. In this way, in a case in which the game played at the terminal device 50 of the concerned pair for which communication was disconnected is played at another terminal device 50 when the communication is restored after the disconnection, the game cannot be played continuously at the terminal device 50 of the concerned pair, but the credit acquired in a play during the disconnected period at the terminal device 50 of the concerned pair can be obtained (i.e., added to the amount of credit stored in the database 108 as the credit information for the player who continued to play the game at the terminal device 50 of the concerned pair after the communication disconnection).

After that, the lock control process for the concerned pair is immediately terminated without waiting for the current time to become four o'clock in the morning.

The determination whether there is any sign of another player having played at the station can be made, for example, by the updater 181 referring to the update history of the game data corresponding to the station.

On the other hand, during the communication disconnection period, if there is no sign of another player having played at the concerned station (if a result of the determination in Step Sa38 is NO), there is no need to consider the above inconsistences. Accordingly, in order to protect a result of the play which had been progressing over the communication disconnection period at the terminal device 50 for which the communication was restored, the updater 181 first updates, in the database 108, the game field information and the medal IN/OUT information of game data corresponding to the player ID of the terminal device 50 respectively with the received game field information and medal IN/OUT information, and second, updates the credit information of the player data with the received credit information, and third, again registers a player ID corresponding to a player of the terminal device 50, as the information on player ID of the game data in the database 108 (Step Sa40). When this update is executed, the updater 181, fourth, updates the time information with the current time indicated by the real time clock.

If there is no sign of another player having played at the concerned station, this means that the station is not in a locked state. Therefore, if there is no sign of another player having played at the concerned station when the communication is restored, the station is locked (Step Sa40). Thus, the first game server 10 sets the station to be in the locked state again when the locked state of the station has been discontinued in a case in which the disconnected communication is restored. In this way, when the communication is restored in a case in which the communication was disconnected for some reason and if the game played at the terminal device 50 is not played at another terminal device 50, the game can be played continuously.

After that, the processing procedure again returns to Step Sa31.

In a case in which the pusher game using a station is played by a player at the terminal device 50, at the first game server 10, the lock control process as follows is executed with the terminal device 50 and the station as a pair.

First, in a case in which the game data, etc., is received from the terminal device 50 every time a certain time period has elapsed, because the processing procedure loops a circulation path of Steps Sa31→Sa32→Sa33→(Sa31), the database 108 is updated to the received game data, etc., every time the game data, etc., is received.

If a termination notification is received from the terminal device 50, the updating is no longer performed after the updating was performed for the last time with the game data, etc., contained in the termination notification in the preceding Step Sa5. If the current time reaches four o'clock in the morning, the processing procedure branches off from Step Sa33 in the circulation path to a path of Step Sa34, and the locked state of the station at which a play was being played is forcibly removed. The game data immediately before the current time reaches four o'clock in the morning is recorded (updated) in the database 108 by the process of Step Sa32 in the circulation path.

In a case in which the first game server 10 had received the game data, etc., from the terminal device 50 executing the pusher game every time a certain time period elapses but can no longer receive the game data, etc., for some reason in the middle, the processing procedure branches off from Step Sa31 in the circulation path to Step Sa36, the locked state of the station for the pusher game is removed.

When the locked state is removed, at the station at which a play was performed, another player is now able to play the pusher game. In a case in which the communication that had been disconnected is restored, and if there is any sign of another player having played at the station during the communication disconnection period, a result of the determination in Step Sa38 becomes YES. Accordingly, in the database 108, only the credit information is updated of the player who was playing at the terminal device 50 for which the communication has been restored.

On the other hand, in a case in which the communication that had been disconnected is restored, and if there is no sign of another player having played the station during the communication disconnection period, a result of the determination in Step Sa38 becomes NO. Accordingly, after the database 108 is updated with the game data, etc., in accordance with the progress of the game during the communication disconnection period, with the game being played at the terminal device 50 for which the communication has been restored, the processing procedure enters the above circulation path, and the database 108 is updated to game data, etc., received at every predetermined time period, every time the game data, etc., is received.

As described above, the lock control process is executed when the pusher game using a station is started at the terminal device 50, with respect to a pair of the terminal device 50 and the station.

For this reason, in a case in which the terminal device at which a play had been performed by using a station has been restored from the incommunicable state, and in which the credit information is updated due to the signs of another player having played at the station, the lock control process is terminated for a pair of the terminal device 50 for which the communication has been restored and the station. On the other hand, when another player uses the same station to start a play, the execution of the lock control process for a pair of a terminal device played by another player and the same station is started, and the locked state of the station at which the pusher game is played by another player will be controlled.

In such a lock control process, even if a play of the pusher game at the station is not normally terminated, it is possible to prevent the station from being fraudulently occupied by a player, such a fraudulent occupation resulting in blocking another player to select the station. A case in which the play of the pusher game is not normally terminated is, for example, the forced termination of the application program 512 at the terminal device 50, the lack of interaction with the terminal device 50 by a player, or the communication disconnection between the terminal device 50 and the first game server 10.

Thus, the first game server 10 prohibits plural players from simultaneously playing the pusher game at one station, prevents the station from being fraudulently occupied by one player, and prevents the storage of a fraudulent medal array state.

FIG. 17 is a diagram showing an example of a table in the database 108, the table storing the number of medals acquired for each player. This table is generated by the updater 181 referring to the database 108 and obtaining, from among the credit information for each player, the number of medals at the end of the running period having increased or decreased with respect to the number of medals at the start of the running period.

In FIG. 17, an example is shown in which the number of medals acquired corresponding to a player whose nickname is "MUG" has been updated from "5,364" at the start of the running period to "5,815" at the end of the running period. In FIG. 17, players are associated with their nicknames, but in actuality, are managed by IDs uniquely identifying respective players.

The updater 181, upon receiving game data from the terminal device (first terminal device) 50 of a player who plays the pusher game, updates game field information in game data, managed in the database 108, corresponding to a station (game machine ID) selected when the player plays the pusher game, with game field information contained in the received game data. As a result, the array state of medals, etc., at the end of the pusher game of this time will be restored when the same station is selected again at a terminal device (second terminal device) 50 of a player who has selected the station. Therefore, a player playing the game using the second terminal device 50 can start the game with a game state that is carried over from the preceding game. Then, the game data is reupdated in accordance with the progress of the game at the second terminal device 50. Thus, the updater 181 updates game data stored in the database 108 in the storage unit 106 in accordance with the progress of a game that is played at one of the terminal devices 50, followed by reupdating the game data in accordance with the progress of the game that is played at another of the terminal devices 50.

Ranking in First Game

When the running period ends, as described above with reference to Step S12 in FIG. 5, at the first game server 10, the updater 181 refers to the table having stored the number of medals acquired for each player, and sorts the players in descending order of the number of medals acquired during the running period, thereby generating a ranking.

FIG. 18 is a diagram showing an example of the ranking. The information of the ranking is transmitted to the terminal device 50 of players participating in the first game and also transmitted to the second game server 20.

The terminal device 50, based on the received ranking information, may indicate where a player who was operating the terminal device is ranked from among all the participants, or may scroll display the ranking by receiving a flicking or dragging operation.

If it is configured so that the ranking is generated and notified to the terminal device 50 not only at the end of the running period but also point by point during the running period, the competition among players participating in the first game is promoted.

Second Game

When the ranking is generated, the second game is provided based on the ranking. The second game is, for example, a roulette having "0" to "10" pockets (pocket numbers), and, for example, the following rules are applied.

(1) In the second game, from among players who participated in the pusher game as the first game, the top 10 players having acquired a large number of medals are regarded as high-order players, and the other players as low-order players.

(2) Each of the top 10 high-order players are allocated one-to-one to the pocket numbers "1" to "10" of the roulette wheel.

(3) The high-order player is allowed to bet a freely selected number of medals within the range of the number of medal holdings only on the pocket number allocated to the player. The high-order player does not necessarily have to make a bet on the pocket number for the player.

(4) The low-order player is allowed to bet a freely selected number of medals within the range of the number of medal holdings on the pocket numbers "1" to "10". The bet may be made on two or more pocket numbers.

(5) The drawing probability for each of the pocket numbers "1" to "10" is set depending on the proportion of the number of medals bet on each pocket number. The payout rate against winning (odds) is set depending on the number of medals bet.

As is understood from the above rules, the pocket number "0" is a so-called "losing number", on which no player can make a bet. That is, the pocket numbers "1" to "10" correspond to a first option, and the pocket number "0" corresponds to a second option.

Figure 19:
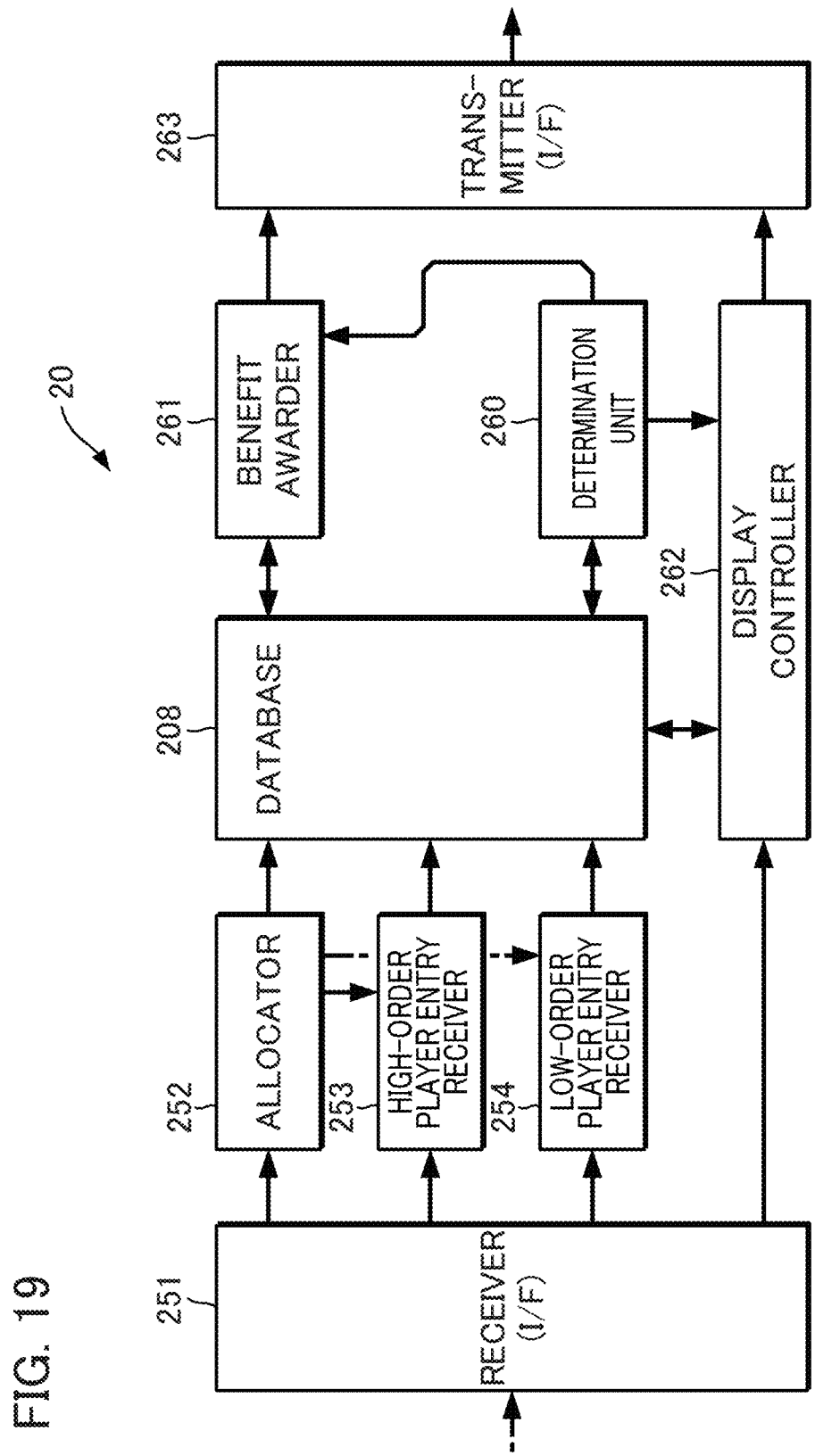
FIG. 19 is a diagram showing functional blocks configured in a second game server.

FIG. 19 is a diagram showing functional blocks configured when the CPU 201 of the second game server 20 provides the second game. As shown in this figure, the execution of a computer program that provides the second game causes the respective ones of an allocator 252, a high-order player entry receiver 253, a low-order player entry receiver 254, a determination unit 260, a benefit awarder 261, and a display controller 262 to be configured. The receiver 251 and transmitter 263 correspond to the interface 205, which is a hardware element, but are shown as separate functional blocks, for convenience.

It is to be noted that these functional blocks are configured separately in plural servers.

In this figure, the allocator 252 sets the top 10 players in the ranking as high-order players and players other than the high-order players as low-order players. Also, the allocator 252 randomly allocates each pocket number one-to-one to each of the high-order players. In this case, the allocator 252 notifies the high-order player entry receiver 253 of the high-order players who have been allocated the respective pocket numbers, and notifies the low-order player entry receiver 254 of the set low-order players. Specifically, the allocator 252 notifies the high-order player entry receiver 253 of information on the allocated high-order players, for example, the nicknames of the high-order players and the player IDs of the high-order players, etc., and notifies the low-order player entry receiver 254 of information on the set low-order players, for example, the nicknames of the low-order players and the player IDs of the low-order players.

However, the allocation of the pocket numbers to the high-order players is not limited to the random allocation, but the allocator 252 may perform the allocation according to a predetermined rule such as allocating the odd pocket numbers sequentially to the number-one to the number-five high-order players and allocating the even numbers sequentially to the number-six to the number-ten high-order players.

The high-order player entry receiver 253 receives the entry for participation into the second game by the high-order players. As described above, because each high-order player is allowed to bet only on the pocket number allocated for the player, "the entry for participation by the high-order player" is synonymous with betting a medal on the pocket number of the player.

The high-order player entry receiver 253 has already been notified of the information on the high-order players from the allocator 252. Therefore, the high-order player entry receiver 253, when the entry for participation (bet) is instructed from a player, determines whether the player is a high-order player, and is allowed to accept the bet from the high-order player if the determination result is affirmative.

Upon receiving an instruction for a bet from the high-order player, the high-order player entry receiver 253 generates, in the database 208, a player table in which the number of medals to bet is associated with the high-order player. Also, when the high-order player adds medals bet on the pocket number of the player, the high-order player entry receiver 253 adds the number of medals of the player table by the number of the additional medals.

The low-order player entry receiver 254 receives an entry for participation into the second game by the low-order player. As described above, because the low-order player can make a bet on any pocket number from "1" to "10", "the entry for participation by the low-order player" is synonymous with selecting one of the pocket numbers and betting medals.

The low-order player entry receiver 254 has already been notified of the information on the low-order player from the allocator 252. Therefore, the low-order player entry receiver 254, when the selection of one of the pocket numbers and bet is instructed from a player, determines whether the player is a low-order player, and is allowed to accept the selection of one of the pocket numbers and the bet from the low-order player if the determination result is affirmative. A low-order player is a player for whom the determination result by the high-order player entry receiver 253 is negative when the selection of one of the pocket numbers and bet are instructed by the player. Therefore, the low-order player entry receiver 254 may accept the instruction for the selection of one of the pocket numbers and for the bet by a player for whom the determination result by the high-order player entry receiver 253 is negative.

Upon receiving an instruction for the selection of one of the pocket numbers and for the bet by the low-order player, the low-order player entry receiver 254 generates, in the database 208, a player table in which a pocket number to bet on and the number of medals bet are associated with the low-order player. Also, when the low-order player adds a pocket number to bet on or adds medals bet, the low-order player entry receiver 254 updates the content of the player table accordingly.

The determination unit 260, depending on the number of medals bet on each pocket number from "1" to "10", sets the drawing probability and the odds for respective pocket numbers, and draws one of the "0" to "10" pocket numbers depending on the drawing probability. Examples for the setting of the drawing probability and the odds, and the drawing will be described later.

The benefit awarder 261 awards benefit for a player who has made a bet on the pocket number drawn by the determination unit 260.

The display controller 262 generates a web screen in accordance with an operation made with the terminal device 50. The web screen includes a roulette screen such as described below, an odds screen, the effect screen of drawing, etc.

Figure 20:
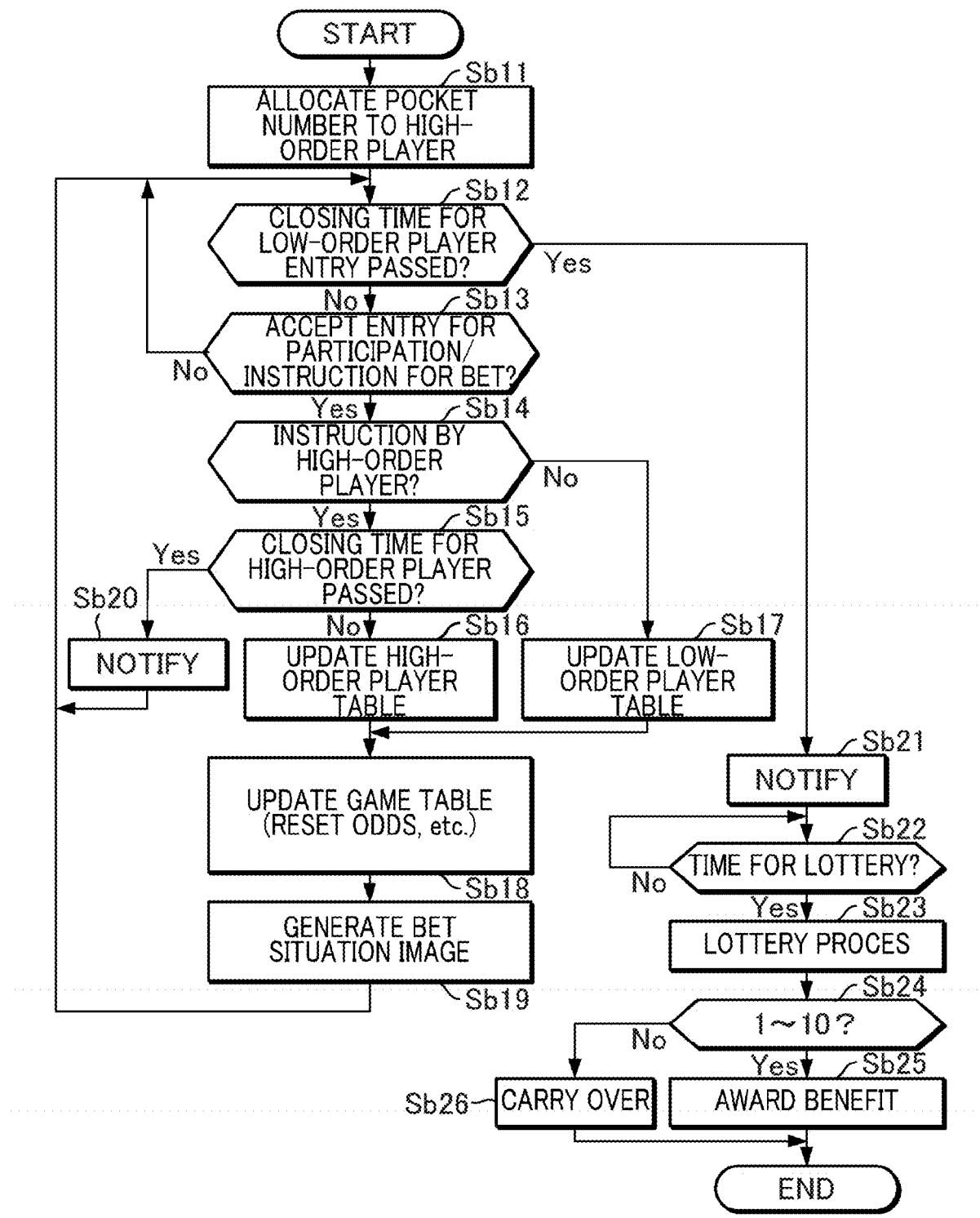
FIG. 20 is a flowchart showing an entry for participation and a bet process in the second game.

FIG. 20 is a flowchart showing a flow of a bet process in the second game.

When, for example, one hour has passed since the ranking of the first game is announced, the second game server 20, in the above-described Step S13, starts providing the second game.

Specifically, first, the CPU 201 (allocator 252) of the second game server 20 sets the top 10 players of the ranking received from the first game server 10 as the high-order players, and allocates, for example, randomly the "1" to "10" pocket numbers respectively to the high-order players on a one-to-one basis (Step Sb11).

FIG. 21 is a diagram showing an example of pocket number allocation to the high-order players.

As shown in this figure, the top 10 high-order players in the ranking for the first game are allocated the pocket numbers of the roulette for the second game. Because those players under the number eleven (inclusive) in the ranking are the low-order players, the pocket numbers are not assigned.

After the pocket number allocation in Step Sb11, the CPU 201 determines whether the current time has passed the closing time for low-order player entry (Step Sb12).

Figure 22:
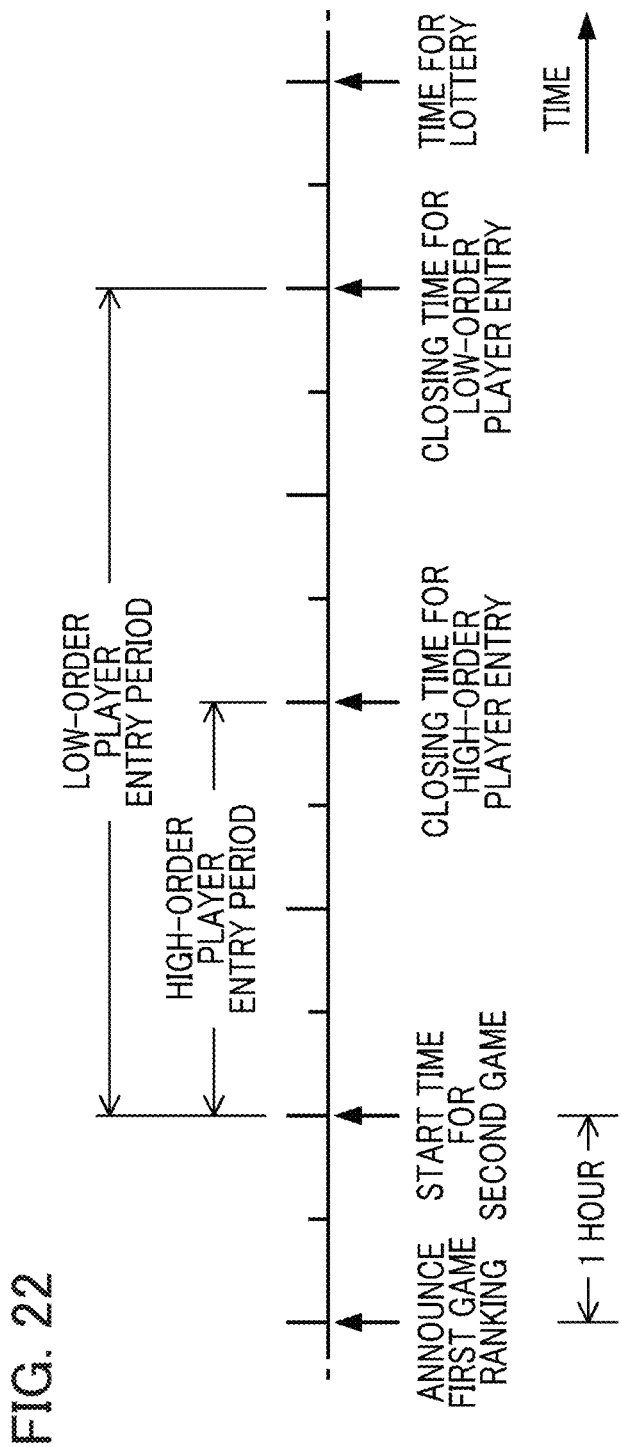
FIG. 22 is a diagram showing a time flow in the second game.

The closing time for low-order player entry is, as shown in FIG. 22 as an example, a time at which four hours have passed since the start time of the second game. The closing time for high-order player entry is, for example, as shown in the figure as an example, a time at which two hours have passed since the start time of the second game and is previous to the closing time for low-order player entry. In the present description, the start time for high-order player entry and the start time for low-order player entry are identical, and are the start time of the second game.

When a result of the determination in Step Sb12 is NO, the CPU 201 determines whether an instruction for bet has been received from any high-order player or low-order player (Step Sb13). If a result of the determination in Step Sb13 is NO, the CPU 201 returns the processing procedure to Step Sb12. Therefore, in a case in which the current time is at or previous to the closing time for low-order player entry and in which no instruction for bet has been received from a player, the processing procedure loops Steps Sb12 and Sb13.

On the other hand, in a case in which the current time is at or previous to the closing time for low-order player entry and in which an instruction for bet has been received from a player, i.e., when a result of the determination in Step Sb13 turns YES, the CPU 201 determines whether the received instruction is an instruction from one of the high-order players (Step Sb14).

In a case in which the received instruction is an instruction from one of the high-order players (when a result of the determination in Step Sb14 is YES), the CPU 201 determines whether the current time has passed the closing time for high-order player entry (Step Sb15).

As shown in FIG. 22, because the closing time for high-order player entry is previous to the closing time for low-order player entry, even if the current time has passed the closing time for high-order player entry, there are cases in which the current time has not passed the closing time for low-order player entry. In this case, an instruction from one of the high-order players received after the closing time for high-order player entry has passed must be nullified, whereas an instruction from one of the low-order players must be accepted.

Therefore, when an instruction from one of the high-order players is received and when the current time has passed the closing time for high-order player entry (when results of the determinations in both Steps Sb14 and Sb15 are YES), the CPU 201 notifies the terminal device 50 of the high-order player that the instruction is invalid (Step Sb20), and returns the processing procedure to Step Sb12 so as to be prepared for a next instruction.

On the other hand, when an instruction from one of the high-order players is received and when the current time is at or previous to the closing time for high-order player entry (when a result of the determination in Step Sb14 is YES and when a result of the determination in Step Sb15 is NO), the CPU 201 (the high-order player entry receiver 253) generates or updates a player table for the high-order player in accordance with the instruction (Step Sb16).

The player table is a table storing the number of medals bet by a player for each pocket number, and is managed for each player in the database 208.

The high-order player is only allowed to bet on the pocket number allocated to the player. Therefore, for example, in a case in which a player "MUG" who has been allocated to the pocket number "6" makes a bet of 213 medals on the pocket number "6" of the player, a player table such as shown in the section (A) of FIG. 23 is generated. Also, when the number of medals bet is increased, the number of medals in the player table is increased (updated) by the number of additional medals.

On the other hand, when an instruction for bet has been received from a player, and when it is determined that the instruction is not from one of the high-order players (when a result of the determination in Step Sb14 is NO), the instruction is from one of the low-order players. Therefore, the CPU 201 (the low-order player entry receiver 254) generates or updates a player table for the low-order player in accordance with the instruction (Step Sb17).

Because the low-order player is allowed to make a bet of a medal on a freely selected one of the "1" to "10" pocket numbers, there is a case in which medals are bet on each of plural pocket numbers as shown in the sections (B) and (C) of FIG. 23 as an example. The example in the section (B) of FIG. 23 shows a state in which a low-order player, "KIRIKO", has made a bet of 65 medals on the pocket number "3", has made a bet of 32 medals on the pocket number "5", and has made a bet of 12 medals on the pocket number "9", respectively. The example in the section (C) of FIG. 23 shows a state in which a low-order player, "NOBUHIKO" has made a bet of 34 medals on the pocket number "1" and has made a bet of 21 medals on the pocket number "5", respectively.

When an instruction is received from a low-order player for betting additional medals on one of the pocket numbers, the number of medals in the player table for the low-order player is increased (updated) by the number of additional medals.

When the player table is generated (or updated) in Step Sb16 or in Step Sb17, the CPU 201 (the determination unit 260) has the updated content reflected in the game table (Step Sb18). The game table is, for example, as shown in FIG. 24, a table storing the total number of medals bet for each pocket number allocated for each high-order player, the odds, and the drawing probability, in association respectively with "1" to "10" pocket numbers. Step Sb18 is a process of having the updated content reflected in the player table, and of again setting (resetting) of the odds and the drawing probability of each pocket number. Specific description of the process thereof will follow.

The CPU 201 first refers to the player table generated (or updated) in Step Sb16 or Step Sb17, aggregates the number of medals bet on each pocket number, and writes the number of medals for each pocket number into the field for the total a. In the example of FIG. 24, the CPU 201 aggregates all the number of medals bet on the pocket number "1" in the player tables, and writes the aggregated value "8,157" in the field of the total number of medals bet for each pocket number a in the game table. The CPU 201 executes the writing operation for each of the "1" to "10" pocket numbers.

Second, the CPU 201 obtains the sum of the total number of medals bet for each pocket number a from the pocket number "1" to "10" in the game table, and writes the sum in the field for the grand sum b. In the example of FIG. 24, the CPU 201 aggregates in the game table all the total number of medals bet for each pocket number from the pocket number "1" to "10", and writes the sum "220,343" into the field of the grand sum b.

Figure 25:
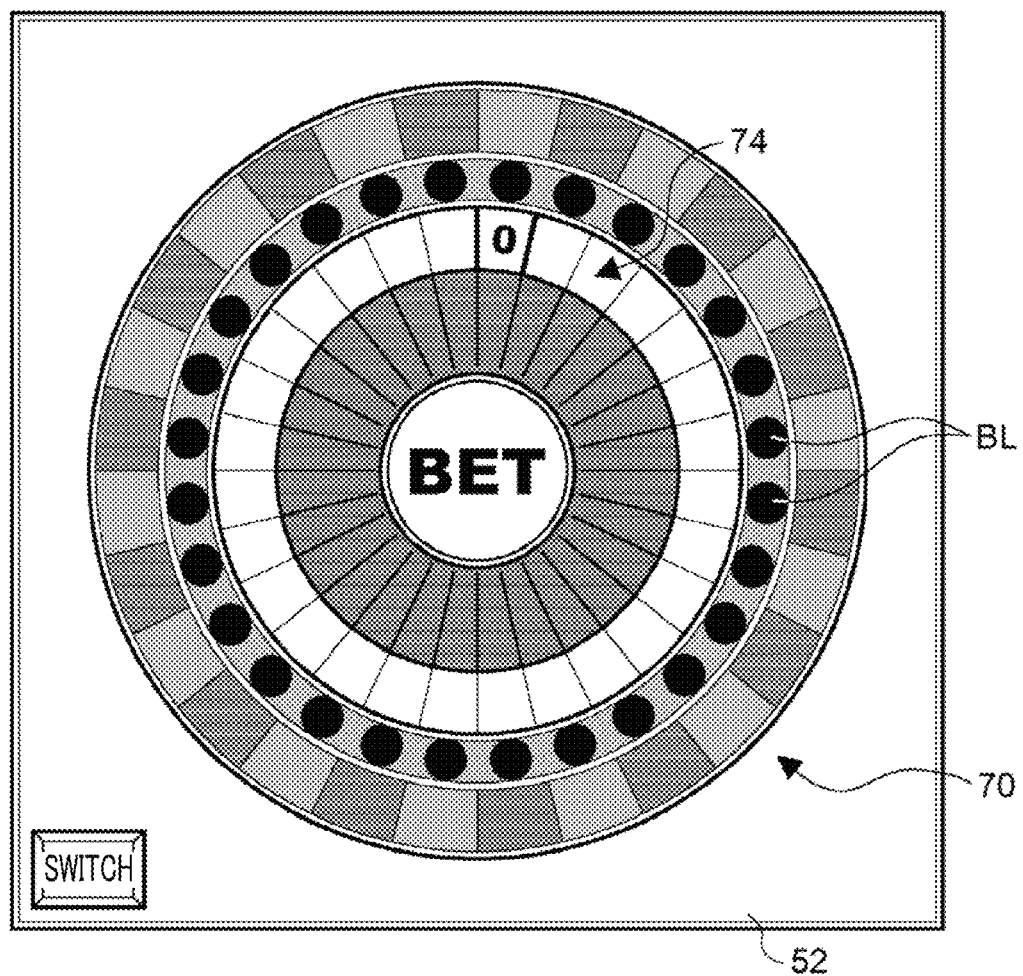
FIG. 25 is a diagram showing an example of a display screen generated at the second game server.

FIG. 25 is a diagram showing an initial state of a roulette table, which is assumed to be the second game, and is displayed on the display unit 52 of the terminal device 50.

As shown in this figure, the roulette table 70 is equally divided into 28 sections. One of the sections is fixedly allocated the pocket number "0", which is equivalent to a losing number. On the other hand, the remaining 27 sections are allocated the pocket numbers "1" to "10" in a dynamic manner in a proportion corresponding to the number of medals bet. The allocated numbers are displayed in an annular area 74, which is the third circle when counted from the outer side of the table 70. However, because FIG. 25 shows an initial state, i.e., a state in which no bet has been made, the pocket numbers from "1" to "10" are not shown therein.

In the roulette table 70, in the area which is the second circle when counted from the outer side, 28 circular spots BL corresponding to the sections are displayed in black or white (in FIG. 25, all the circles are displayed in black). In an actual roulette game, the pocket number of a pocket onto which a ball has dropped is a winning number. However, in this description, in order to reduce the calculation burden for display, the table 70 is made a fixed image, and a spot BL in white mimicking a ball is displayed as if the spot was circularly moving, for example, clockwise. The speed of the circular movement is gradually reduced, and a pocket number allocated to the section of a spot BL at which the white spot BL finally comes to stop is made a winning number. It is to be noted that, in actuality, as described later, a winning pocket number is determined in advance through a lottery, and an image is generated in which the white spot BL stops at the determined pocket number.

In such a roulette table, the drawing probability for each of the pocket numbers from "1" to "10" is a value obtained by diving up 27/28, excluding the pocket number "0", in the proportion corresponding to the number of medals bet on each pocket number.

Accordingly, third, the CPU 201 obtains the drawing probability of each pocket number in the following way, to be written into the field of the drawing probability c in the game table.

$$\text{drawing probability } c = (27/28) \times (\text{the total number of medals bet for each pocket number } a/\text{grand sum } b)$$

Fourth, the CPU 201 obtains the odds d for each pocket number, as the reciprocal (1/c) of the drawing probability c, to be written into the field of the odds d in the game table.

Because the pocket number "0" is fixedly allocated to one of the 28 sections in the table 70, the drawing probability of the pocket number "0" is 1/28 (=0.0357).

Next, the CPU 201 generates a bet situation image corresponding to the content of the game table as of the current point in time (Step Sb19).

Specifically, the CPU 201, with the pocket number "0" in the area 74 shown in FIG. 25 as a reference, for example, has the "1" to "10" pocket numbers arranged clockwise. In this case, the number of sections occupied by each pocket number is made corresponding to the drawing probability c written in the game table. Then, the CPU 201 has the avatars of the high-order players respectively allocated to each pocket number arranged in the first circle from the outer side of the table 70.

Figure 26:
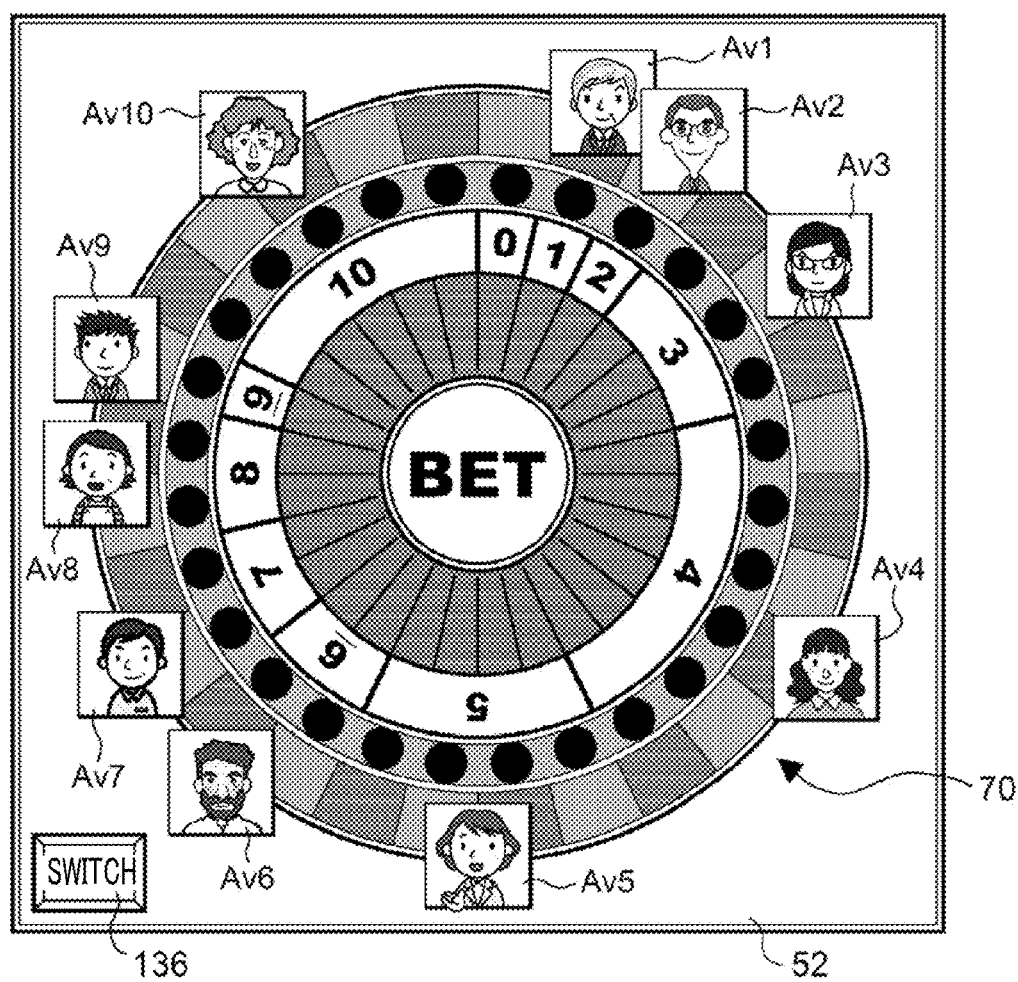
FIG. 26 is a diagram showing an example of a display screen generated at the second game server.

For example, in a case in which the drawing probabilities of the "1" to "10" pocket numbers are values such as shown in the game table of FIG. 24, an image such as shown in FIG. 26 is generated. In this example, the drawing probability of 0.0357 (=1/28) is equivalent to one section, and therefore, one section is allocated to the pocket number "1". Likewise, the pocket number "2" is allocated 1 section, the pocket number "3" is allocated 3 sections, the pocket number "4" is allocated 6 sections, the pocket number "5" is allocated 4 sections, the pocket number "6" is allocated 2 sections, the pocket number "7" is allocated 2 sections, the pocket number "8" is allocated 2 sections, the pocket number "9" is allocated 1 section, and the pocket number "10" is allocated 5 sections.

Thus changing the size of each pocket number in units of the section is convenient for the terminal device 50 for which the size of the display unit 52 is small and the process capability is not so high.

Also, arranged beside pocket number "1" is an avatar Av1 of a player allocated to the pocket number "1". Similarly, beside the pocket numbers "2" to "10" are respectively arranged the avatars Av2 to Av10 of players allocated to the pocket numbers "2" to "10".

The CPU 201 transmits the thus generated bet situation image to the terminal device 50, for display on the display unit 52. In such a bet situation image, the drawing probability set depending on the number of medals bet is displayed as the number of sections in the table 70, i.e., the size (angle) depending on the rate. Therefore, a player is able to intuitively know how much the drawing probability is for each pocket number.

After generating the bet situation image, the CPU 201 returns the processing procedure to Step Sb12 to prepare for a next instruction for bet. Therefore, the generation of a bet situation image is executed every time the processing procedure loops Steps Sb12 to Sb19, i.e., every time a bet of medals is instructed by a player. For this reason, if automatic reloading is set at the terminal device 50 and when the number of medals bet on each pocket number (the drawing probability for pocket number) has changed considerably, it appears as a change in the number of sections allocated at the display unit 52. Therefore, a player is also able to know the bet situation as the change in the number of sections.

The bet situation image indicated in FIG. 26 includes a button 136 instructing switching of the screen. In the terminal device 50, when an operation for switching the button 136 to be ON is detected by the touch panel 54, the terminal device 50 transmits the information of this operation to the second game server 20. Upon receiving the information of this operation at the second game server 20, the CPU 201 refers to the game table to generate a web screen such as shown in FIG. 27, and causes the display unit 52 of the terminal device 50 to display the web screen.

The web screen is a screen that displays, for each pocket number, the odds, the sum of medals (bet medals), and the total number of players who made a bet, i.e., the number of anticipators, of the current point in time. The web screen also serves as an input screen for a player to make entry for participation in the second game. Although not shown, when the pocket number of the screen is operated in accordance with an instruction, for example, a display prompting the instruction for the number of medals to bet pops up.

This web screen is scroll displayed by flicking or dragging, and therefore, the hidden pocket numbers of "5" and greater are also displayed.

In Step Sb12, when it is determined that the current time has passed the closing time for low-order player entry, the CPU 201 notifies the terminal devices 50 of the high-order players and the low-order players that the entry for bet in the second game can no longer be accepted (Step Sb21).

When the processing procedure branches off to Step Sb21, the updating of the player table will not be reflected in the game table thereafter. Accordingly, the drawing probability and the odds for each pocket number are settled with the content of the game table at the time of branching, i.e., at the closing time for low-order player entry.

After that, the CPU 201 determines whether the current time has reached a time for a lottery (Step Sb22). The lottery time is, for example, as shown in FIG. 22, one hour after the closing time for low-order player entry. If the current time has not reached the lottery time, the CPU 201 returns the processing procedure to Step Sb22. A result of the determination continues to be NO until the current time reaches the lottery time, and in this case, the processing procedure will loop the Step Sb22.

On the other hand, when the current time reaches the lottery time, the loop is over. Therefore, the CPU 201 executes a lottery process (Step Sb23). Specifically, the CPU 201 (the determination unit 260) draws one of the "0" to "10" pocket numbers at the drawing probabilities set in the game table.

Figure 28:
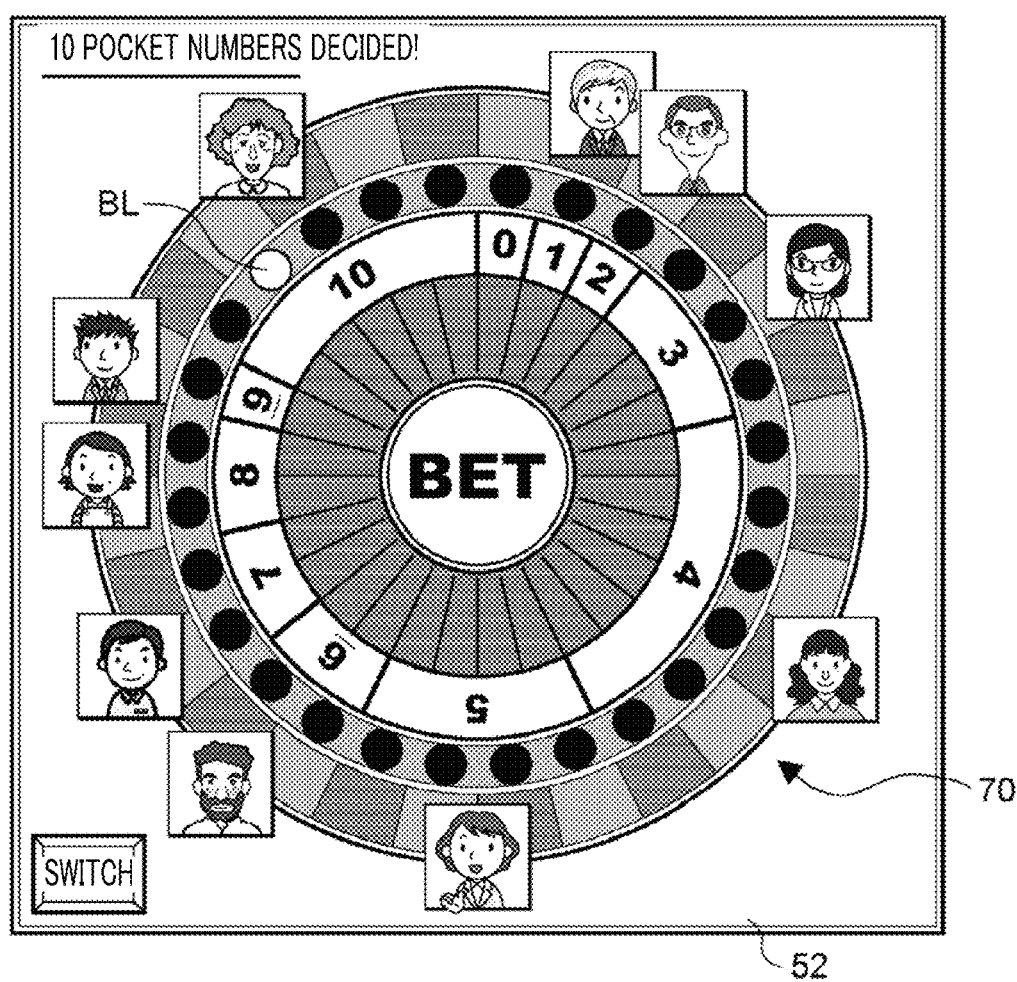
FIG. 28 is a diagram showing an example of a display screen generated at the second game server.

When a pocket number is thus drawn, the CPU 201 (display controller 262) generates an effect screen such as causing a spot BL in white mimicking a ball to be displayed as if the spot was circularly moving clockwise, causing the speed of the circular movement to be reduced gradually, and making the white spot BL to stop at one of the sections belonging to drawn pocket numbers. FIG. 28 is an example of an effect screen when the pocket number "10" is drawn.

Such an effect screen is displayed on the display unit 52 when a request is made at the terminal device 50, whereby a player is able to know a result of the lottery.

When a lottery is executed, the CPU 201 determines whether the drawn pocket number is one of "1" to "10" (Step Sb24). In a case in which this determination result is YES, the CPU 201 executes a benefit awarding process (Step Sb25). Specifically, the CPU 201 (the benefit awarder 261) first retrieves the player table to read information on a player who has made a bet on the drawn pocket number and the number of medals bet. Second, the CPU 201 (the benefit awarder 261) reads information on the odds for the drawn pocket number from the game table, third, obtains the product of the number of bet medals and the odds to round the product to an integer, and fourth, adds the obtained integral value to the number of medal holdings for the player. This process is executed for every player who has made a bet on the drawn pocket number.

With the above process, medals depending on the respective numbers of bet medals are paid out to players who made bets on the drawn pocket number. The adding operation of the number of medals to the medal holdings is executed at the first game server 10, i.e., the credit information of the player data for the corresponding player in the database 108 is updated with the number of medals added.

In adding the integral value to the number of medal holdings for a player, if there is carry-over from the previous lottery, the carried over medals are distributed, for example, depending on the proportion of the number of medals bet on the drawn pocket number.

On the other hand, if the drawn pocket number is none of "1" to "10", that means that the pocket number "0" is drawn. Therefore, the CPU 201 notifies the terminal devices 50 of players who have made entries of that effect, and the total number of medals bet this time is stored in the database 208 as carried-over medals for subsequent payout (Step Sb26).

Because this will allow the increase in the paid out amount if a winning number is hit in a lottery subsequent to a lottery in which the pocket number "0" was drawn, the increase in the number of entries for participation in the game can be expected.

Alternatively, all the medals bet, i.e., the medals corresponding to the grand sum b in the game table, may be taken by the dealer (the second game server 20) because the pocket number "0" is a losing number. Alternatively, it may be configured so that a portion of the medals bet this time is carried over to subsequent payout instead of having all of the total number of medals carried over.

In this way, the pocket number "0" (the second option) serves as a losing number, and at least a part of the total number of medals (game values) can be carried over to a subsequent second game when the second option is selected.

After Step Sb25 or Sb26, the CPU 201 ends the flow of the bet process. As a result, the second game will also be ended.

Thus, allowing the low-order player of the first game to participate in the second game by making a bet of medals on pocket numbers "1" to "10" likened to the high-order players enables providing the low-order player encouragement and fun for making an entry for participation in the game. That is, because, if a player becomes a high-order player of the first game, the avatar of the player will be made public as corresponding to a pocket number for the second game, the player is made to feel "I want to be a high order player someday". Also, because the participants of the second game are also the participants of the first game, a sense of unity of the entire game increases, which could be fun for the players.

Also, the odds set for each pocket number in the second game are a gauge of popularity for a player to whom the pocket number has been allocated. Therefore, a high-order player is able to understand the player's own popularity among players who participate in the second game.

Applications and Modifications

The present invention is not limited to the above-described embodiment, and various applications or modifications, such as described below, are possible. Also, freely selected one or a plurality of the applications and modifications described below can be combined as appropriate.

Friendship between Players

It may be configured so that, in a case in which there are plural players who have made bets on the drawn pocket number, the benefits awarded to players who have engaged in the friendship are more luxurious than the benefit awarded to players who are not.

Figure 29:
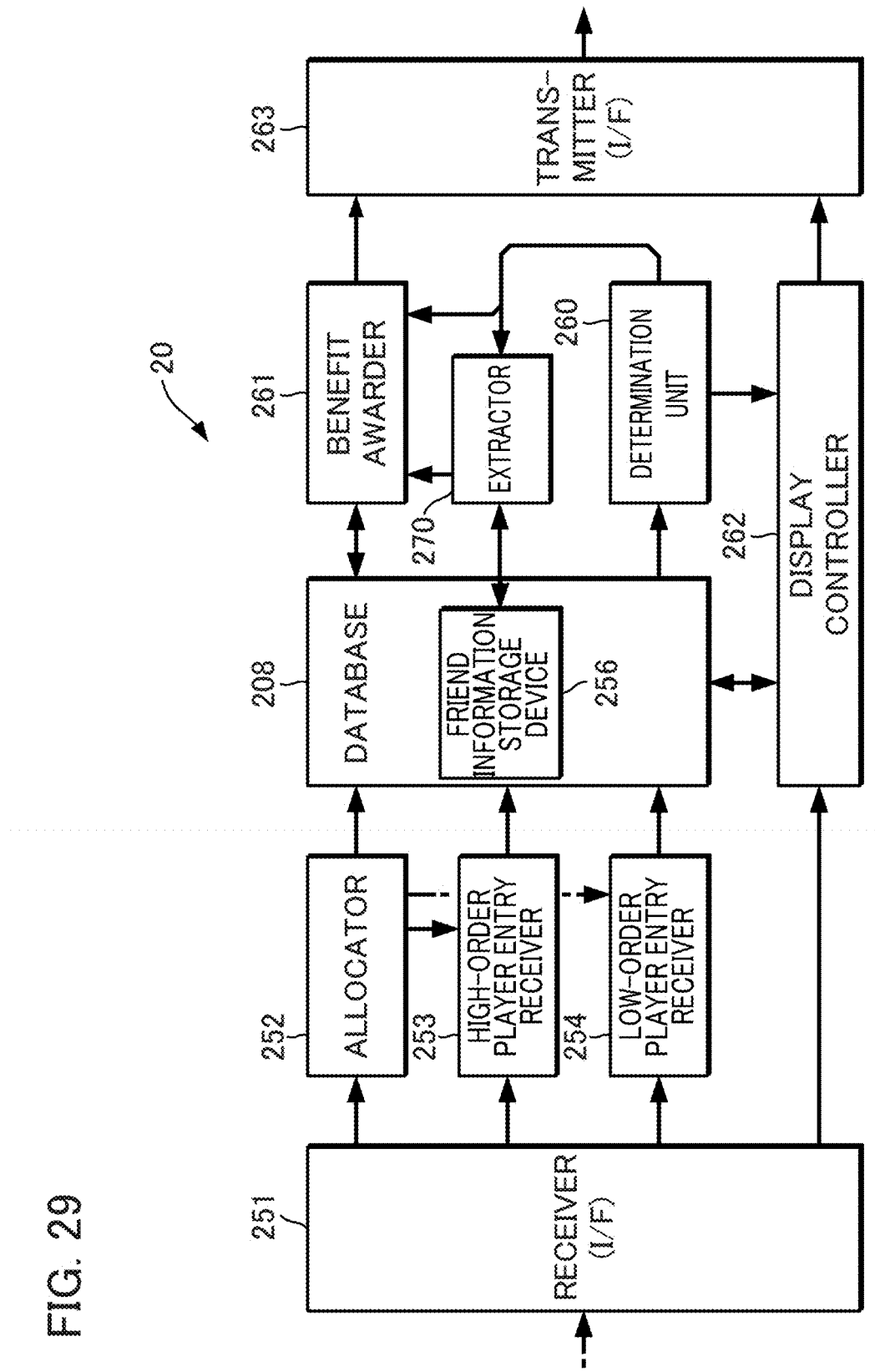
FIG. 29 is a functional block diagram of a second game server according to an application example.

FIG. 29 is a diagram showing functional blocks for implementing this configuration. In FIG. 29, a friend information storage device 256 and an extractor 270 have been added to what are shown in FIG. 19.

The friend information storage device 256 is managed in the database 208, and stores information friendship among players. The friendship is, for example, as shown in FIG. 30, diagramed by link connections, and therefore, information indicating such link connections is stored in the friend information storage device 256.

Figure 30:
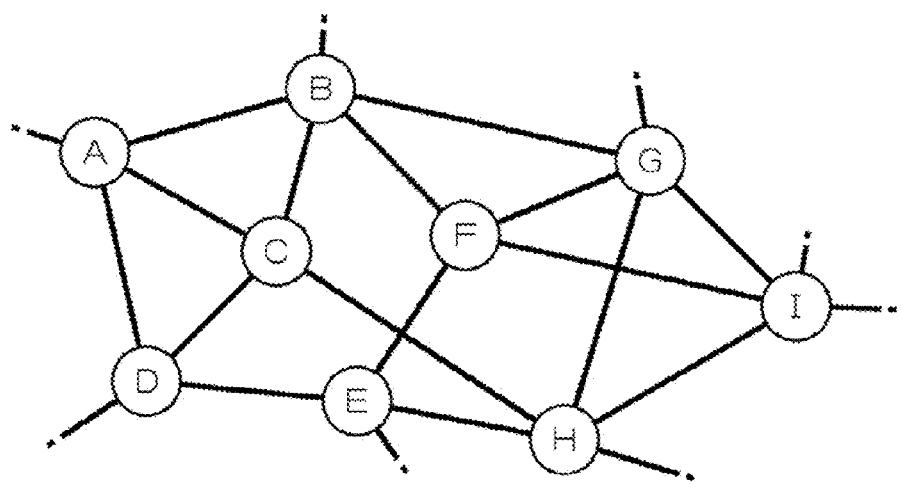
FIG. 30 is a diagram showing a specific example of content stored in a friend information storage device.

FIG. 30 shows friend relationships among players "A" to "I".

When a pocket number is drawn by the determination unit 260, and when there are plural players who have bet on the drawn pocket number, the extractor 270 retrieves the friend information storage device 256 to extract players among whom friendship has been formed, and reports a result to the benefit awarder 261. If there are no players among whom friendship has been formed, the extractor 270 reports that effect to the benefit awarder 261.

When a pocket number is drawn, and when it receives a report about players who have been engaged in friendship, the benefit awarder 261 makes the benefits awarded to these players more luxurious than the benefit awarded to a player having no friendship. For example, the benefit awarder 261 adds 50% more to the paid out number of medals. The benefit awarder 261 pays out the normal number of medals upon receiving a report that there are no players among whom friendship has been formed.

Entry for Participation, Benefit, Etc.

In the embodiment, making a bet of a game value such as a medal is equivalent to making entries for participation in the second game, but it may be configured so that a player can participate in the second game without making a bet of a game value, for example, free of charge. As for the benefit to be awarded, the benefit awarded to a player who has selected the winning pocket number only has to be luxurious relative to that for a player who has not selected. Accordingly, the benefit is not limited to be those related to the first game, such as medals, but may be those unrelated to the content of the game, for example, a card.

Entry Period

In the embodiment, the high-order player entry period and the low-order player entry period partially overlap, and the start timings are synchronized, but the two entry periods do not have to overlap, or the start timings do not have to be synchronized. For example, the entry period may be divided into the first-half and the second-half periods, and the first-half period may be the high-order player entry period, and the second-half period may be the low-order player entry period. Dividing in such a way excludes the entry for participation from the low-order player in the first-half, and only the entries by the high-order players are reflected. Therefore, the low-order player can make an entry for participation in the second half by considering the entry situations by the high-order players (as a model).

In any case, the closing time of the low-order player entry period only has to be after the closing timing of the high-order player entry period.

Determination Whether Game is Played at Station

In the embodiment, in a case in which the pusher game is played at a station, a player ID is stored in association with the station (i.e., the game machine ID of game data corresponding to the station) in the database 108, and the player ID is deleted from the game data at the end of the play, but another method may be employed. For example, when the play of the pusher game is started, a play flag indicating "in play" and a player ID may be stored in association with the station, and when a game play is ended at the station, the play flag is changed to "out of play". In a case in which the play flag indicates "out of play", a play by another player at the corresponding station is permitted, and in a case in which the play flag indicates "in play", play by another player at the corresponding station is prohibited.

In this way, even in a case in which communication from the terminal device 50 to the game server 10 at a predetermined interval is discontinued, when the communication is restored, the relationship between a player of the terminal device 50 and a station at which a game is played by the player may be restored under a condition that the player ID that has been stored in association with the station has not changed. Specifically, a player ID stored in association with the station is retained, and only the play flag is changed from "out of play" to "in play". That is, for example, even in a case in which communication between the terminal device 50 and the game server 10 is discontinued without player's intention, it can be restored to a state before the communication was discontinued.

However, even if a play flag is not stored in association with a station as described above, the same effect can be obtained by retaining the player ID stored in association with a station without deleting it.

Other Matters

In the above description, the first game is described as the pusher game, but the first game may be a game other than a medal game. For example, the first game may be a slot machine game, pachinko game, card game, or any other game in which a game state is carried over.

It may be configured so that the first game does not have to be one type of game, e.g., only the pusher game, but may be a combination of plural types of games, e.g., a slot machine game, pachinko game, card game, pusher game, etc., out of which games to be played can be selected by a player. When plural types of games are provided, the ranking may be generated depending on the total number of medals acquired in the plural types of games. Also, providing each game as a native type or a browser type can be freely selected.

In the above embodiment, the second game is a roulette game, but the present invention is not limited thereto. The second game may be one such as determining one of plural options with a predetermined drawing probability, for example, a dart game. In the embodiment, the high-order players are the top 10 players of the first game, but the present invention is not limited thereto. Also, the number of sections does not have to be 28.

The following aspects of the invention are understood from the embodiment, modifications, and applications described in the foregoing.

In one aspect, the invention is understood to be a game system including: plural terminal devices (at least one game device) at which a game can be played by a player; and a game server configured to communicate with the terminal devices, the game server stores game data corresponding to the game in a storage device, and the game server updates game data stored in the storage device in accordance with the progress of a game that is played at one of the terminal devices, followed by again updating the game data in accordance with the progress of the game that is played at another of the terminal devices. The game system 1 is a non-limiting example of such a game system of the present invention. According to the above embodiment, which is non-limiting, the game system 1 includes the plural game devices 50 and the first game server 10, and the first game server 10 stores game data corresponding to a game in the storage unit 106.

In a preferred embodiment, the game server may transmit, when a game starts at one of the terminal devices, game data stored in the storage device and corresponding to the game to the terminal device at which the game has started, the terminal device may update the game data received from the game server in accordance with the progress of the game, the terminal device may transmit the updated game data to the game server when the game ends, and the game server may update game data stored in the storage device and corresponding to the game data received from the terminal device.

Preferably, the game server may set a game played at one of the terminal devices to be in a locked state, thereby prohibiting the play of the game at another of the terminal devices, and the game server may discontinue the locked state of the game when the game ends at the terminal device, thereby permitting the play of the game at another of the terminal devices.

Preferably, the game server may periodically perform communication with the terminal device at which the game is progressing and discontinues the locked state of the game when the communication is disconnected.

Preferably, the game server, in the communication at the predetermined interval, may receive game data of the game from the terminal device at which the game is played at the predetermined interval, and may update game data stored in the storage device and corresponding to the game data received from the terminal device. Preferably, the game server may set the game to be in the locked state again when the locked state of the game that was being played at the terminal device has been discontinued in a case in which the disconnected communication is restored.

In another preferred embodiment, the game server may store in the storage device, in association with each of the players, credit information that varies depending on consumption of credit as exchange for a play in a game or on awarding of a game value in accordance with a result of a game, and it may be configured so that, when the game that was being played at the terminal device is in the locked stated in a case in which the disconnected communication is restored, the game server does not update game data of the game that was being played at the terminal device for which the communication is restored, but updates credit information corresponding to a player of the terminal device in accordance with changes in the amount of credit in a play while the communication is disconnected.

In still another embodiment, the game server may store in the storage device plural pieces of game data respectively corresponding to plural games progressing independently from one another, and the game server may present, to the terminal device, before a game starts, respective play states of the plural games based on the plural pieces of game data respectively corresponding to each of the games, whereas, when a game of the plural games is selected for a play at the terminal device, the locked state for the selected game having been removed, the game server may transmit game data of the selected game to the terminal device. Preferably, the game data may be game field information prescribing an arrangement of medals in a pusher game.

In another aspect, the present invention is understood to be a game server for managing a game played at plural terminal devices with which the game server is communicable, the game server including: a game data manager that stores game data corresponding to a game in a storage device; an updater that updates game data stored in the storage device in accordance with the progress of a game that is played in one of the terminal devices, followed by reupdating the game data in accordance with the progress of the game that is played at another of the terminal device.

In still another aspect, the present invention is understood to be a control method for a game server for communicating with plural terminal devices at which a game can be played by a player, the method including: storing game data corresponding to a game in a storage device; updating game data stored in the storage device in accordance with the progress of a game that is played in one of the terminal devices; and again updating the game data in accordance with the progress of the game that is played at another of the terminal devices.

In still yet another aspect, the present invention is understood to be a non-transitory computer recording readable medium having stored thereon a program for executing a method in a computer for communicating with plural terminal devices at which a game can be played by a player, the method including: storing game data corresponding to a game in a storage device; updating game data stored in the storage device in accordance with the progress of a game that is played in one of the terminal devices; and again updating the game data again in accordance with the progress of the game that is played at another of the terminal device.

DESCRIPTION OF REFERENCE NUMERALS

1 . . . game system, 10 . . . first game server, 20 . . . second game server, 50 . . . terminal device, 52 . . . display unit, 101 . . . CPU, 106 . . . storage unit, 108 . . . database, 181 . . . updater, 201 . . . CPU, 252 . . . allocator, 253 . . . high-order player entry receiver, 254 . . . low-order player entry receiver, 260 . . . determination unit, 261 . . . benefit awarder, 262 . . . display controller, and 270 . . . extractor.

What is claimed:

1. A game system comprising:
plural terminal devices at which a game can be played by a player; and
a game server configured to communicate with the terminal devices, the game server comprising circuitry configured to:
store game data corresponding to the game and store, in association with each of the players, credit information that varies depending on consumption of credit as exchange for a play in a game or on awarding of a game value in accordance with a result of a game in a storage device;
set a game played at one of the terminal devices to be in a locked state, thereby prohibiting the play of the game at another of the terminal devices;
periodically perform communication with the terminal device at which the game is progressing, and periodically receive game data of the game from the terminal device, to update game data that is stored in the storage device and that corresponds to the game data received from the terminal device in accordance with the progress of the game that is played at the terminal device, followed by again updating the game data in accordance with the progress of the game that is played at another of the terminal devices; and
remove the locked state of the game when the game ends at the terminal device or when the communication is disconnected, thereby permitting the play of the game at another of the terminal devices,
wherein, when the game that was being played at the terminal device is in the locked state in a case in which the disconnected communication has been restored, the circuitry of the game server is further configured not to update game data of the game that was being played at the terminal device for which the communication has been restored, but to update credit information corresponding to a player of the terminal device in accordance with changes in the amount of credit in a play while the communication was being disconnected.

2. The game system of claim 1,
wherein the circuitry of the game server is further configured to transmit, when a game starts at one of the terminal devices, game data stored in the storage device and corresponding to the game to the terminal device at which the game has started, and
the terminal device comprising circuitry configured to:
update the game data received from the game server in accordance with the progress of the game, and
transmit the updated game data to the game server when the game ends.

3. The game system of claim 1,
wherein, when the locked state of the game that was being played at the terminal device has been discontinued in a case in which the disconnected communication is restored, the circuitry of the game server is configured to set the game to be in the locked state again.

4. The game system of claim 1,
wherein the circuitry of the game server is configured to store in the storage device plural pieces of game data respectively corresponding to plural games progressing independently from one another, and
wherein the circuitry of the game server is configured to present, to the terminal device, before a game starts, respective play states of the plural games based on the plural pieces of game data respectively corresponding to each of the games, whereas, when a game of the plural games is selected for a play at the terminal device, the locked state for the selected game having been removed, the circuitry of the game server is configured to transmit game data of the selected game to the terminal device.

5. The game system of claim 4,
wherein the game data is game field information prescribing an arrangement of medals in a pusher game.

6. The game system of claim 1, wherein the circuitry of the game server is configured to determine whether a player differing from the player of the terminal device was playing the game during a period in which the communication with the terminal device was being disconnected,
wherein, when the game that was being played at the terminal device is not in the locked state in a case in which the disconnected communication has been restored, and when the circuitry of the game server has determined that the game that was being played at the terminal device during the period of the disconnected communication was played by the other player, the circuitry of the game server is configured not to update game data of the game that was being played at the terminal device for which the communication has been restored, but to update credit information corresponding to the player of the terminal device in accordance with changes in the amount of credit in a play while the communication was being disconnected.

7. The game system of claim 1, wherein the circuitry of the game server is configured to determine whether a player differing from the player of the terminal device was playing the game during a period in which the communication with the terminal device was being disconnected,
wherein, when the game that was being played at the terminal device is not in the locked state in a case in which the disconnected communication has been restored, and when the circuitry of the game server has determined that the game that was being played at the terminal device during the period of the disconnected communication was not played by the other player, the circuitry of the game server is configured to update game data of the game that was being played at the terminal device for which the communication has been restored and also to update credit information corresponding to the player of the terminal device and set the game that is played at the terminal device to a locked state.

8. A game server for managing a game played at plural terminal devices with which the game server is communicable, the game server comprising circuitry configured to:

store game data corresponding to a game and store, in association with each of the players, credit information that varies depending on consumption of credit as exchange for a play in a game or on awarding of a game value in accordance with a result of a game in a storage device;

set a game played at one of the terminal devices to be in a locked state, thereby prohibiting the play of the game at another of the terminal devices;

periodically perform communication with the terminal device at which the game is progressing, and periodically receive game data of the game from the terminal device, to update game data that is stored in the storage device and that corresponds to the game data received from the terminal device in accordance with the progress of the game that is played in the terminal device, followed by again updating the game data in accordance with the progress of the game that is played at another of the terminal devices; and remove the locked state of the game when the game ends at the terminal device or when the communication is disconnected, thereby permitting the play of the game at another of the terminal devices, wherein, when the game that was being played at the terminal device is in the locked state in a case in which the disconnected communication has been restored, the circuitry of the game server is further configured not to update game data of the game that was being played at the terminal device for which the communication has been restored, but to update credit information corresponding to a player of the terminal device in accordance with changes in the amount of credit in a play while the communication was being disconnected.

9. A control method for a game server for communicating with plural terminal devices at which a game can be played by a player, the method comprising:

storing game data corresponding to a game and storing, in association with each of the players, credit information that varies depending on consumption of credit as exchange for a play in a game or on awarding of a game value in accordance with a result of a game in a storage device;

setting a game played at one of the terminal devices to be in a locked state, thereby prohibiting the play of the game at another of the terminal devices;

periodically performing communication with the terminal device at which the game is progressing, and periodically receiving game data of the game from the terminal device, to update game data that is stored in the storage device and that corresponds to the game data received from the terminal device in accordance with the progress of the game that is played in the terminal device followed by again updating the game data in accordance with the progress of the game that is played at another of the terminal devices; and removing the locked state of the game when the game ends at the terminal device or when the communication is disconnected, thereby permitting the play of the game at another of the terminal devices, wherein, when the game that was being played at the terminal device is in the locked state in a case in which the disconnected communication has been restored, not updating game data of the game that was being played at the terminal device for which the communication has been restored, but updating credit information corresponding to a player of the terminal device in accordance with changes in the amount of credit in a play while the communication was being disconnected.

10. A non-transitory computer recording readable medium having stored thereon a program for executing a method in a computer for communicating with plural terminal devices at which a game can be played by a player, the method comprising:

storing game data corresponding to a game and storing, in association with each of the players, credit information that varies depending on consumption of credit as exchange for a play in a game or on awarding of a game value in accordance with a result of a game in a storage device;

setting a game played at one of the terminal devices to be in a locked state, thereby prohibiting the play of the game at another of the terminal devices;

periodically performing communication with the terminal device at which the game is progressing, and periodically receiving game data of the game from the terminal device, to update game data that is stored in the storage device and that corresponds to the game data received from the terminal device in accordance with the progress of the game that is played in the terminal device, followed by again updating the game data again in accordance with the progress of the game that is played at another of the terminal devices; and removing the locked state of the game when the game ends at the terminal device or when the communication is disconnected, thereby permitting the play of the game at another of the terminal devices, wherein, when the game that was being played at the terminal device is in the locked state in a case in which the disconnected communication has been restored, not updating game data of the game that was being played at the terminal device for which the communication has been restored, but updating credit information corresponding to a player of the terminal device in accordance with changes in the amount of credit in a play while the communication was being disconnected.

* * * * *